(12) United States Patent
Akbari et al.

(10) Patent No.: US 12,453,695 B2
(45) Date of Patent: Oct. 28, 2025

(54) SCENTED ANTIBACTERIAL NANOFIBROUS LAYER

(71) Applicant: Somaye Akbari, Tehran (IR)

(72) Inventors: Somaye Akbari, Tehran (IR); Maryam Mounesan, Tehran (IR); Mohammad Haghighat kish, Tehran (IR); Niloofar Kamroodi, Tehran (IR)

(73) Assignees: Somaye Akbari (IR); Jahan Orum Oyaz (IR); AMIRKABIR UNIVERSITY OF TECHNOLOGY (IR)

( * ) Notice: Subject to any disclaimer, the term of this patent is extended or adjusted under 35 U.S.C. 154(b) by 1264 days.

(21) Appl. No.: 15/734,313

(22) PCT Filed: Jul. 14, 2018

(86) PCT No.: PCT/IB2018/055222
§ 371 (c)(1),
(2) Date: Dec. 2, 2020

(87) PCT Pub. No.: WO2020/016623
PCT Pub. Date: Jan. 23, 2020

(65) Prior Publication Data
US 2021/0220255 A1    Jul. 22, 2021

(51) Int. Cl.
| | | |
|---|---|---|
| A61K 8/9789 | (2017.01) | |
| A61K 8/02 | (2006.01) | |
| A61K 8/9794 | (2017.01) | |
| D01D 5/00 | (2006.01) | |
| D01F 1/10 | (2006.01) | |
| D04H 1/728 | (2012.01) | |

(52) U.S. Cl.
CPC .......... *A61K 8/9789* (2017.08); *A61K 8/0212* (2013.01); *A61K 8/027* (2013.01); *A61K 8/9794* (2017.08); *D01D 5/003* (2013.01); *D01F 1/103* (2013.01); *D04H 1/728* (2013.01)

(58) Field of Classification Search
None
See application file for complete search history.

(56) References Cited

U.S. PATENT DOCUMENTS

| | | | | |
|---|---|---|---|---|
| 9,175,422 | B2 * | 11/2015 | Nagarajan | .............. D01D 5/003 |
| 2013/0112618 | A1 * | 5/2013 | Diallo | ................... B01D 71/76 |
| | | | | 210/500.33 |

FOREIGN PATENT DOCUMENTS

| | | | | |
|---|---|---|---|---|
| WO | WO-2009045042 A1 * | 4/2009 | ............. | D01D 5/003 |
| WO | WO-2009133059 A2 * | 11/2009 | ............... | A61K 8/02 |

\* cited by examiner

*Primary Examiner* — Alton N Pryor

(57) ABSTRACT

An electrospun nanofibrous layer may include an exemplary polymer scaffold made of at least one of nylon, polyester, polyvinyl alcohol, chitosan, and acrylic, an amine-terminated dendritic polymer that may be attached to and distributed within the exemplary polymer scaffold. An exemplary amine-terminated dendritic polymer may include at least one of polyamidoamine, polypropylene imine, and polyethylene imine. An electrospun nanofibrous layer may further include an exemplary volatile aromatic compound that may be encapsulated within the amine-terminated dendritic polymer.

5 Claims, 21 Drawing Sheets

SCENTED ANTIBACTERIAL NANOFIBROUS LAYER

CROSS-REFERENCE TO RELATED APPLICATION

This application is a continuation-in-part of international Application No. PCT/IB2018/055222, filed Jul. 14, 2018, and entitled "ANTIBACTERIAL NANOFIBROUS LAYER," which is incorporated herein by reference in its entirety.

TECHNICAL FIELD

The present disclosure relates to antibacterial nanofibrous layers and particularly relates to scented antibacterial nanofibrous layers containing volatile aromatic compounds. More particularly, the present disclosure relates to scented antibacterial nanofibrous layers and methods for producing the same based on electrospinning techniques.

BACKGROUND

Some volatile aromatic compounds, such as natural extracts or synthetic essential oils may possess inherent antibacterial, antifungal, antiviral, and even anti-cancer properties. Volatile aromatic compounds such as thyme, eucalyptus, asparagus, clove, rosemary, cinnamon, and other synthetic essential oils may find applications in the production of antibacterial and deodorant materials in textile and fiber industries. For example, fibers and fabrics may be produced that may possess natural plant aroma by encapsulating natural plant extracts into microcapsules. One major problem that may be associated with the application of microcapsules is that microcapsules may tend to be attached and fixed on fabrics with low affinity. Hence, a binder is required to fix the microcapsules on the fabrics. Binders may block an efficient release of natural extracts or synthetic essential oils from the microcapsules.

Another method that may be utilized for preparing fibers containing natural extracts or synthetic essential oils is melt spinning, in which natural extracts or synthetic essential oils are mixed with the polymer and the mixture is heated well above the melting point of the polymer and then melted mixture is extended and solidified into fine yarns. At elevated temperatures of the melt spinning process, natural extracts or synthetic essential oils may evaporate or be decomposed which may significantly affect their efficient release from the fabric. Other methods such as direct application of natural plant extracts or synthetic essential oils onto the textiles or cloths or even indirect methods such as the above-mentioned microencapsulation have the disadvantage of the natural extracts or synthetic essential oils being easily peeled off the textile or cloth due to friction, washing or exposure to sunlight.

There is, therefore, a need for a method that may allow for producing antibacterial and deodorant fibers containing natural extracts or synthetic essential oils with an improved and controllable release of the extracts from the fiber. There is further a need for producing nanofibrous products from the antibacterial and deodorant fibers, such as filters, filter layers in face masks and cigarettes with an improved and controllable release of the natural extracts and synthetic essential oils.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to an electrospun nanofibrous layer. An exemplary electrospun nanofibrous layer may include an exemplary polymer scaffold made of at least one of nylon, polyester, polyvinyl alcohol, chitosan, and acrylic, an amine-terminated dendritic polymer that may be embedded within the exemplary polymer scaffold. An exemplary amine-terminated dendritic polymer may include at least one of polyamidoamine, polypropylene imine, and polyethylene imine. An electrospun nanofibrous layer may further include an exemplary volatile aromatic compound that may be encapsulated within the amine-terminated dendritic polymer.

According to one or more exemplary embodiments, the present disclosure is directed to a method for fabricating a scented antibacterial nanofibrous layer. An exemplary method may include preparing a polymer solution by dissolving a base polymer in a first solvent, mixing a surfactant with the polymer solution, mixing a volatile aromatic compound to the polymer solution, preparing an amine-terminated dendritic polymer solution by dissolving an amine-terminated dendritic polymer in a second solvent, preparing a spinning solution by dispersing the amine-terminated dendritic polymer solution into the polymer solution, and preparing the nanofibrous layer by electrospinning the spinning solution.

In an exemplary embodiment, preparing the amine-terminated dendritic polymer solution may include dissolving a first amount of the amine-terminated dendritic polymer in the second solvent. An exemplary first amount may be between 2 wt. % and 20 wt. % based on a weight of the base polymer.

In an exemplary embodiment, mixing the volatile aromatic compound with the polymer solution may include dropwise addition of a second amount of the volatile aromatic compound to the polymer solution. An exemplary second amount may be between 5 wt. % and 50 wt. % based on a weight of the base polymer.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which.

DETAILED DESCRIPTION

Figure 1:
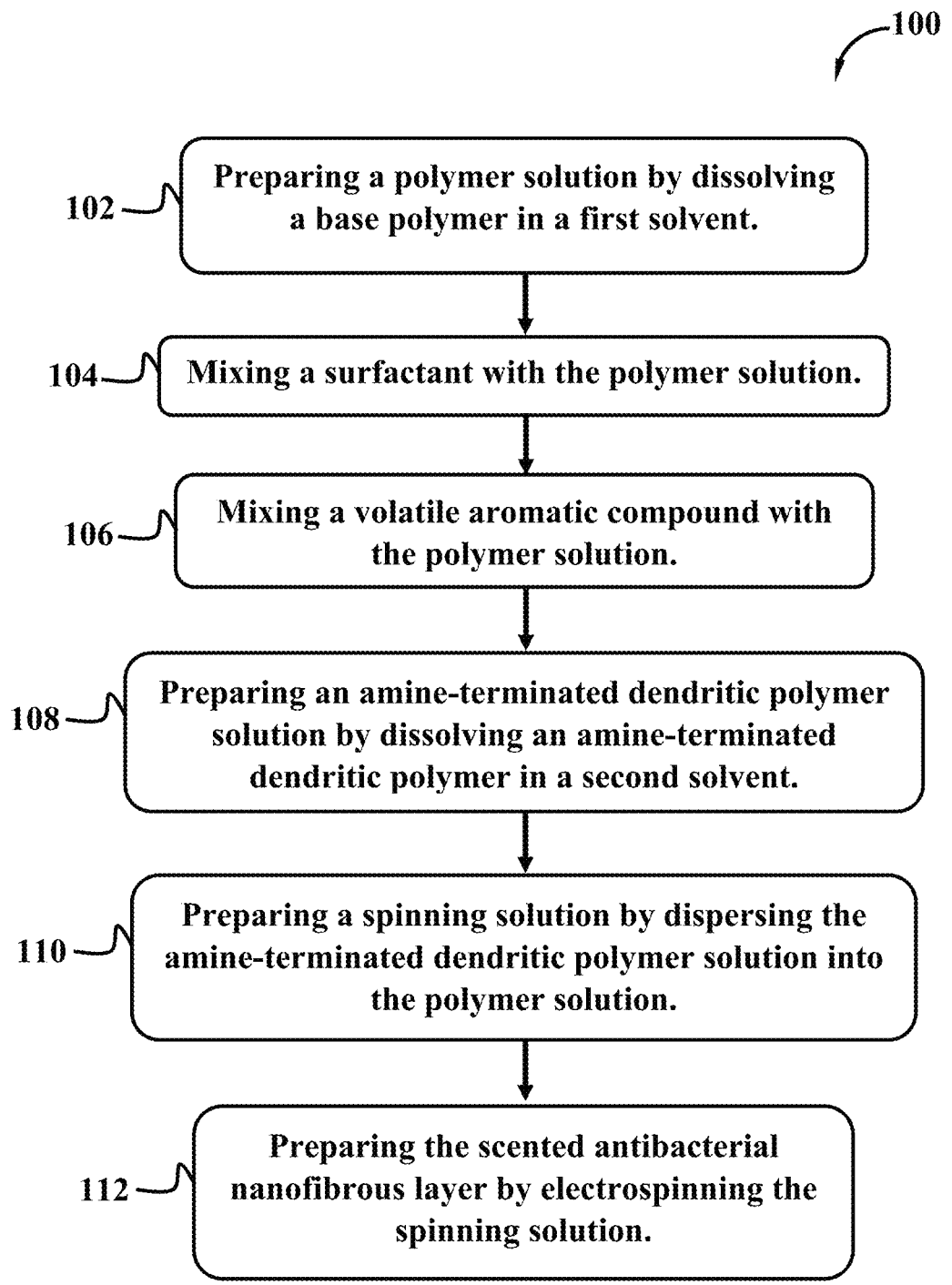
FIG. 1 illustrates a flowchart of a method for preparing a nanofibrous layer, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

Dendrimers are artificial macromolecules that are characterized by tree-like topological structures, highly branched structures of great regularity with empty spaces between the branches, compact shapes, and large numbers of reactive end groups. As used herein, an exemplary highly branched structure may refer to a macromolecule structure with a high degree of branching originating from a core region. Examples of highly branched dendritic macromolecules may include, but are not limited to, dendrimers, hyperbranched polymers, dendrigraft polymers, and core-shell dendrimers.

An exemplary dendrimer may include a core, hyperbranched arms extending from the core with repeated units, and surface functional groups. Exemplary surface functional groups may be located on an outermost layer of an exemplary dendrimer in a multivalent fashion and may significantly influence the physical and chemical properties of the dendrimer. Due to the abundance of hollow spaces between interior branches, an exemplary dendritic structure may host a wide variety of nonpolar or charged guest molecules into its hollow spaces or pockets by hydrophobic/hydrogen-bond interactions. Furthermore, due to the abundance of surface functional groups, an exemplary dendritic structure may host a wide variety of nonpolar or charged guest molecules on its surface by electrostatic interactions. In other words, an exemplary functional group of an exemplary dendrimer may act as a reactive site, which may be capable of attracting and binding to guest molecules of interest. On the other hand, hollow spaces between exemplary branches of an exemplary dendrimer may act as cages or spaces in which a guest molecule of interest may be encaged or encapsulated.

Natural extracts or synthetic essential oils may also be hosted by an exemplary dendritic structure as a method for producing nanofibrous articles containing natural extracts and synthetic essential oils. In an exemplary embodiment, natural extracts or synthetic essential oils may be encaged or encapsulated within exemplary empty spaces between interior branches of an exemplary dendritic structure. In exemplary embodiments, such encapsulation or inclusion of natural extracts and synthetic essential oils within dendritic structures may allow for a long-lasting and controllable release of the natural extracts or synthetic essential oils from the exemplary nanofibrous articles.

According to one or more exemplary embodiments, the present disclosure is directed to an exemplary nanofibrous article or layer that may include an exemplary dendritic polymer embedded within an exemplary polymer scaffold, where an exemplary volatile aromatic compound may be encapsulated or encaged within an exemplary dendritic polymer. In other words, an exemplary dendritic polymer may be utilized as an intermediate compound that may facilitate indirect attachment of an exemplary volatile aromatic compound to an exemplary polymer scaffold of an exemplary nanofibrous structure. In exemplary embodiments, such indirect attachment of an exemplary volatile aromatic compound to an exemplary polymer scaffold utilizing an exemplary dendritic polymer may allow for producing an exemplary scented nanofibrous structure, where the exemplary scent imparted by the exemplary volatile aromatic compound may be controllably released during a relatively long period of time. Furthermore, such indirect attachment of an exemplary volatile aromatic compound to an exemplary polymer scaffold utilizing an exemplary dendritic polymer may further prevent an exemplary volatile aromatic compound to be peeled off of an exemplary polymer scaffold due to a relatively stronger bond between an exemplary dendritic polymer and an exemplary polymer scaffold compared to a direct bond between an exemplary volatile aromatic compound and the exemplary polymer scaffold.

An exemplary volatile aromatic compound may include an exemplary natural extract or an exemplary synthetic essential oil that may be hosted by an exemplary dendritic structure. As used herein, hosted by an exemplary dendritic structure may both refer to attachment of an exemplary volatile aromatic compound to exemplary surface functional groups of an exemplary dendritic structure and encapsulation or entrapment of an exemplary volatile aromatic compound within hollow spaces between branches of an exemplary dendritic structure.

An exemplary polymer scaffold of an exemplary nanofibrous layer may include an exemplary electrospun nanofibrous scaffold made of an exemplary base polymer. An exemplary dendritic polymer may be embedded within an exemplary nanofibrous scaffold made of an exemplary base polymer by simultaneous electrospinning of an exemplary dendritic polymer and an exemplary nanofibrous scaffold. To this end, an exemplary dendritic polymer may be selected for a given base polymer based on the types of corresponding functional groups present on surfaces of an exemplary dendritic polymer and a given base polymer. For example, for a base polymer that may be at least one of nylon, polyester, polyvinyl alcohol, chitosan, and acrylic, a dendritic polymer that may include an amine-terminated dendritic polymer such as polyamidoamine, polypropylene imine, or polyethylene imine may be suitable. In other words, an exemplary base polymer and an exemplary amine-terminated dendritic polymer may include compatible corresponding functional groups, and, therefore, may have a high affinity for each other.

Exemplary natural extracts or synthetic essential oils may be incorporated into an exemplary nanofibrous layer utilizing an exemplary amine-terminated dendritic polymer. As used herein, incorporating exemplary natural extracts or synthetic essential oils into an exemplary nanofibrous layer may refer to distributing the exemplary natural extracts or synthetic essential oils within an exemplary nanofibrous layer. A first amount of exemplary natural extracts or synthetic essential oils may be attached to a surface of an exemplary amine-terminated dendritic polymer and a second amount of exemplary natural extracts or synthetic essential oils may be encapsulated within the exemplary amine-terminated dendritic polymer. Exemplary natural extracts or synthetic essential oils may include, but are not limited to thyme, eucalyptus, tea, asparagus, clove, rosemary, cinnamon, lavender, and mixtures thereof.

In an exemplary embodiment, an exemplary volatile aromatic compound may further include a hydrocarbon, such as isoprene, camphene, p-cymene, limonene, myrcene, cis-ocimene, trans-ocimene, alpha-pinene, beta-pinene, aromadendrin, 3-carene, trans-caryophyllene, isolongifolene, and valencene. In an exemplary embodiment, an exemplary volatile aromatic compound may further include an alcohol or an ether, such as thymol, carvacrol, beta-citronellol, geraniol, alfa-terpineol, linalool, menthol, and sabinene hydrate. In an exemplary embodiment, an exemplary volatile aromatic compound may further include an ester, such as methyl heptine carbonate and geranyl acetate. In an exemplary embodiment, an exemplary volatile aromatic compound may further include an aldehyde or a ketone, such as isomethylionone, pulegone, camphor, menthone, citral, lilial, and nootkatone. In an exemplary embodiment, an exemplary volatile aromatic compound may further include a phenylpropanoid, such as trans-anethole, cinnamaldehyde, estragole, eugenol, isoeugenol, and vanillin.

Exemplary methods and techniques disclosed herein are directed to exemplary embodiments of an exemplary fabrication method for preparing a scented antibacterial nanofibrous layer containing natural extracts or synthetic essential oils. An exemplary fabrication method may include preparing an exemplary spinning solution including an exemplary base polymer, an exemplary surfactant, an exemplary volatile aromatic compound, and an exemplary dendritic polymer. An exemplary fabrication method may further include forming an exemplary nanofibrous layer by electrospinning the exemplary spinning solution. In other words, an exemplary fabrication method may include simultaneous electrospinning of an exemplary base polymer, an exemplary dendritic polymer, and an exemplary volatile aromatic compound. In an exemplary embodiment, such simultaneous electrospinning of an exemplary base polymer, an exemplary dendritic polymer, and an exemplary volatile aromatic compound may allow for the exemplary volatile aromatic compound to be hosted within an exemplary dendritic polymer and an exemplary dendritic polymer to be embedded within the exemplary nanofibrous scaffold provided by an exemplary base polymer.

In exemplary embodiments, such fabrication of an exemplary nanofibrous layer may allow for attaching exemplary natural extracts or synthetic essential oils to an exemplary nanofibrous layer utilizing exemplary dendritic structures. Such attachment utilizing exemplary dendritic structures may ensure an enduring attachment of exemplary natural extracts or synthetic essential oils to exemplary nanofibrous layers due to a stronger interaction between an exemplary nanofibrous layer and exemplary dendritic structures. In addition, such attachment utilizing exemplary dendritic structures may ensure a long-lasting and controllable release of exemplary natural extracts or synthetic essential oils due to the encapsulation of a portion of exemplary natural extracts or synthetic essential oils within exemplary dendritic structures.

An exemplary dendritic structure may be an amine-terminated dendritic polymer that may be at least one of polyamidoamine, polypropylene imine, and polyethylene imine. As used herein, an amine-terminated dendritic polymer may refer to a dendritic polymer, in which branches may end with an amine functional group. An exemplary amine-terminated dendritic structure may include a high degree of branching originated from a core region similar to other dendritic structures. Exemplary amine-terminated dendritic structures with different generations and cores maybe utilized for encapsulating or encaging exemplary volatile aromatic compounds.

Figure 7:
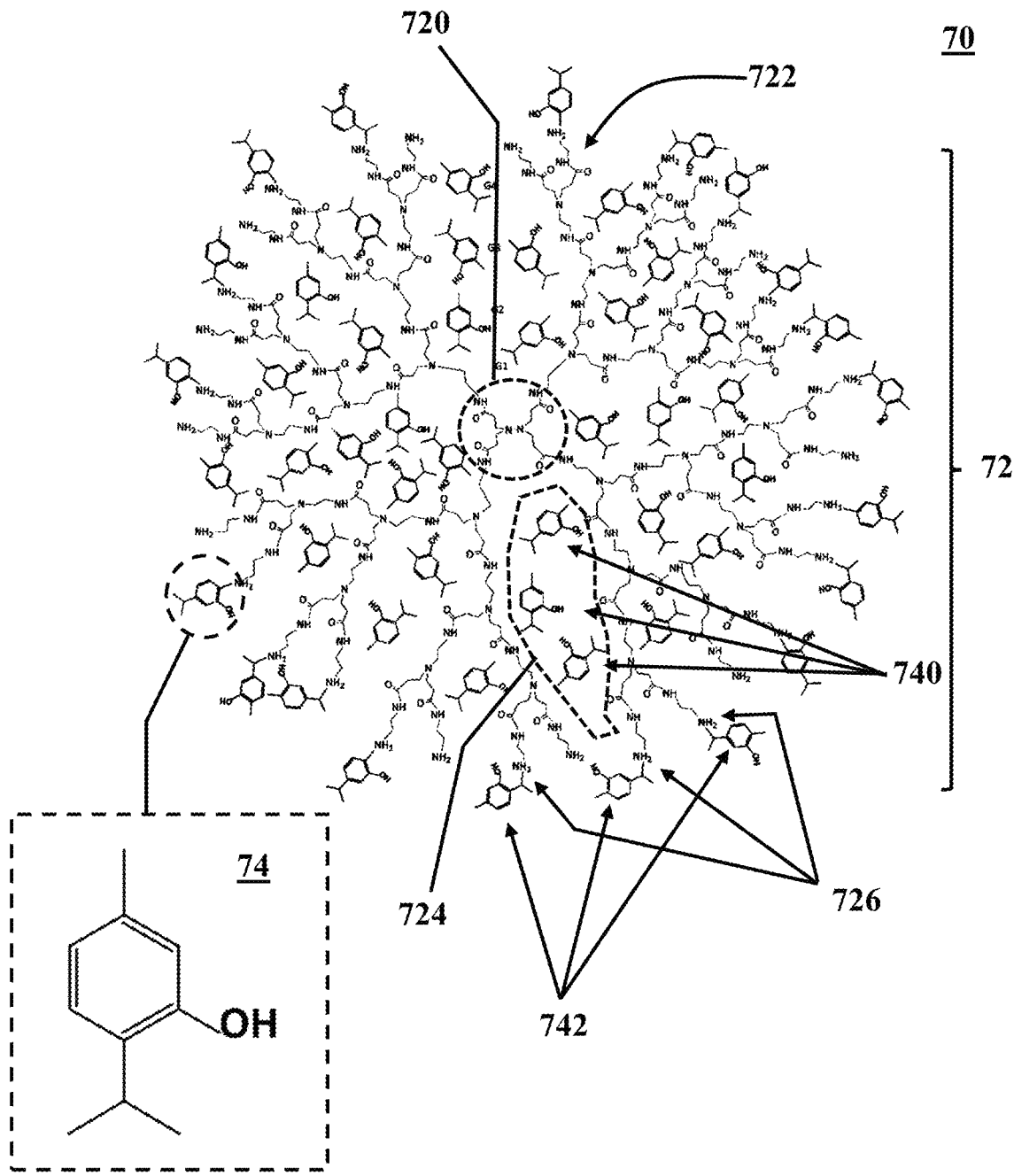
FIG. 7 illustrates a structural representation of thymol molecules hosted within a structure of a fourth generation of polyamidoamine (PAMAM) dendritic polymer, consistent with one or more exemplary embodiments of the present disclosure.

FIG. 7 illustrates a structural representation 70 of thymol molecules 74 hosted within a structure of a fourth generation of polyamidoamine (PAMAM) dendritic polymer 72, consistent with one or more exemplary embodiments of the present disclosure. In an exemplary embodiment, PAMAM dendritic polymer 72 may include a core region 720 and extended branches 722 originating from core region 720. In an exemplary embodiment, a first portion of thymol molecules 74 may be entrapped or encaged within empty spaces between interior branches of PAMAM dendritic polymer 72, for example, thymol molecules 740 may be encaged within empty space 724 between interior branches of PAMAM dendritic polymer 72. In an exemplary embodiment, a second portion of thymol molecules 74 may be attached to functional end groups of PAMAM dendritic polymer 72, for example, thymol molecules 742 may be attached to amine functional end groups 726 of PAMAM dendritic polymer 72.

Figure 8:
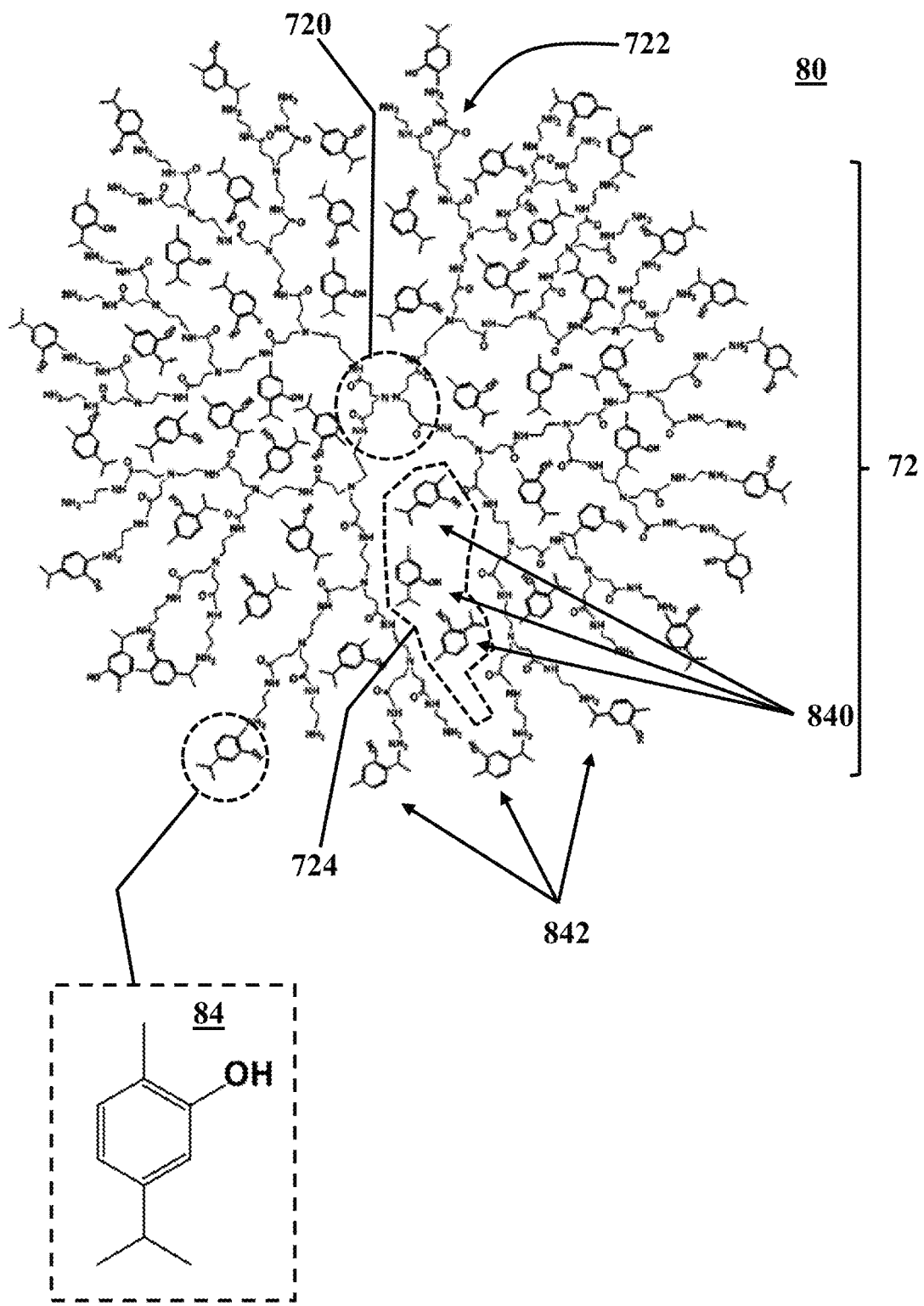
FIG. 8 illustrates a structural representation of carvacrol molecules hosted within a structure of a fourth generation of polyamidoamine (PAMAM) dendritic polymer, consistent with one or more exemplary embodiments of the present disclosure.

FIG. 8 illustrates a structural representation 80 of carvacrol molecules 84 hosted within a structure of a fourth generation of polyamidoamine (PAMAM) dendritic polymer 72, consistent with one or more exemplary embodiments of the present disclosure. In an exemplary embodiment, PAMAM dendritic polymer 72 may include core region 720 and extended branches 722 originating from core region 720. In an exemplary embodiment, a first portion of carvacrol molecules 84 may be entrapped or encaged within empty spaces between interior branches of PAMAM dendritic polymer 720, for example, carvacrol molecules 840 may be encaged within empty space 724 between interior branches of PAMAM dendritic polymer 72. In an exemplary embodiment, a second portion of carvacrol molecules 84 may be attached to functional end groups of PAMAM dendritic polymer 72, for example, carvacrol molecules 842 may be attached to amine functional end groups 726 of PAMAM dendritic polymer 72.

Figure 9:
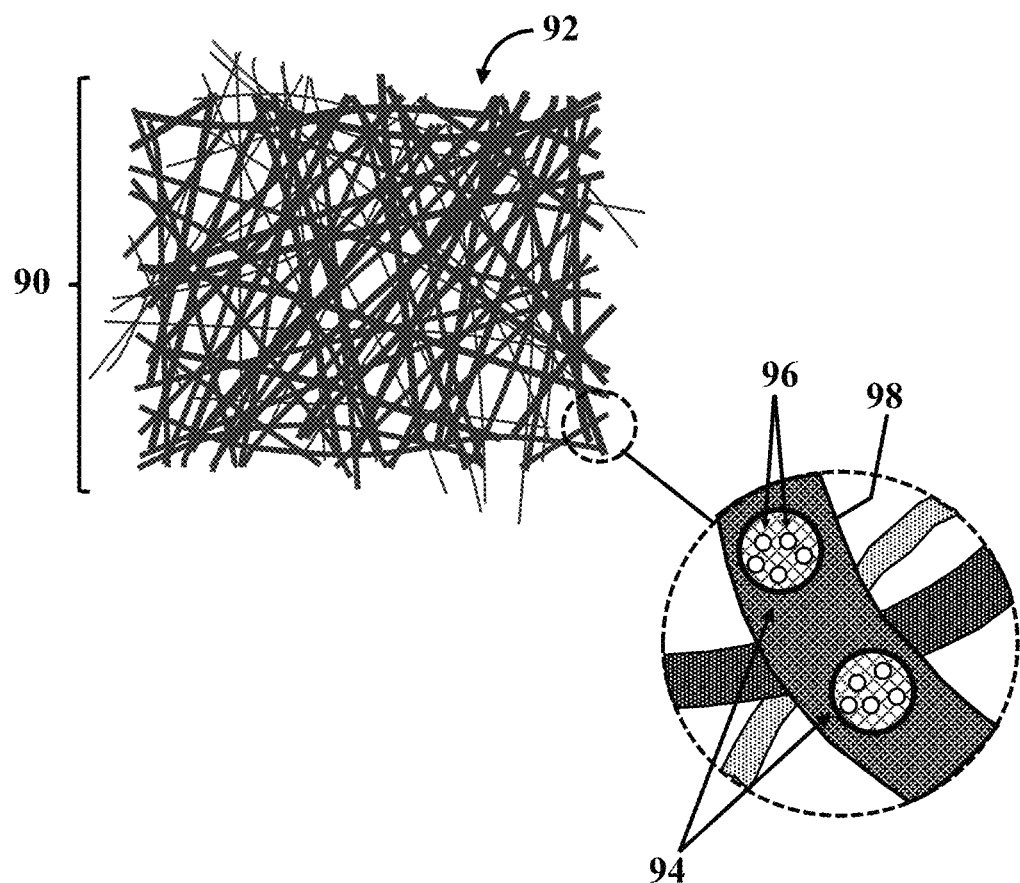
FIG. 9 illustrates a schematic of a scented antibacterial electrospun nanofibrous layer, consistent with one or more exemplary embodiments of the present disclosure.

FIG. 9 illustrates a schematic of a scented antibacterial electrospun nanofibrous layer 90, consistent with one or more exemplary embodiments of the present disclosure. In an exemplary embodiment, scented antibacterial electrospun nanofibrous layer 90 may include a polymer scaffold 92 and amine-terminated dendritic polymer macromolecules, such as amine-terminated dendritic polymer macromolecules 94 that may be embedded within polymer scaffold 92. As used herein, exemplary amine-terminated dendritic polymer macromolecules being embedded within polymer scaffold 92 may refer to exemplary amine-terminated dendritic polymer macromolecules being distributed within each single nanofiber of polymer scaffold 92. For example, in the inset of FIG. 9, amine-terminated dendritic polymer macromolecules 94 are embedded within or attached onto an outer surface of a single fiber 98 of polymer scaffold 92.

In an exemplary embodiment, scented antibacterial electrospun nanofibrous layer 90 may further include exemplary volatile aromatic compounds that may be entrapped or encapsulated within exemplary amine-terminated dendritic polymer macromolecules. For example, volatile aromatic compound molecules 96 may be entrapped or encapsulated within amine-terminated dendritic polymer macromolecule 94. In an exemplary embodiment, polymer scaffold 92 may be an electrospun scaffold made of a base polymer such as at least one of nylon, polyester, polyvinyl alcohol, chitosan, and acrylic. In an exemplary embodiment, amine-terminated dendritic polymer macromolecule 94 may be at least one of polyamidoamine, polypropylene imine, and polyethylene imine. In an exemplary embodiment, volatile aromatic compound molecules 96 may be a hydrocarbon, such as isoprene, camphene, p-cymene, limonene, myrcene, cis-ocimene, trans-ocimene, alpha-pinene, beta-pinene, aromadendrin, 3-carene, trans-caryophyllene, isolongifolene, and valencene, an alcohol or an ether, such as thymol, carvacrol, beta-citronellol, geraniol, alfa-terpineol, linalool, menthol, and sabinene hydrate. In an exemplary embodiment, an exemplary volatile aromatic compound may further include an ester, such as methyl heptine carbonate and geranyl acetate, an aldehyde or a ketone, such as isomethylionone, pulegone, camphor, menthone, citral, lilial, and nootkatone, and a phenylpropanoid, such as trans-anethole, cinnamaldehyde, estragole, eugenol, isoeugenol, and vanillin.

In an exemplary embodiment, amine-terminated dendritic polymer macromolecules, such as amine-terminated dendritic polymer macromolecule 94 may have a concentration of 5 wt. % to 20 wt. % based on a weight of polymer scaffold 92 of scented antibacterial electrospun nanofibrous layer 90. In an exemplary embodiment, volatile aromatic compounds, such as volatile aromatic compound molecules 96 may have a concentration of 10 wt. % to 50 wt. % based on the weight of polymer scaffold 92 of scented antibacterial electrospun nanofibrous layer 90.

An exemplary scented antibacterial electrospun nanofibrous layer may be utilized as a filter layer in face masks, cigarettes, and other similar articles that require an antibacterial and scented filter layer. An exemplary scented antibacterial electrospun nanofibrous layer may be utilized as a scaffold for wound dressing. An exemplary scented antibacterial electrospun nanofibrous layer may further be utilized in aromatherapy devices, air fresheners, and other similar devices that require a long-lasting and stable release of odors and scents. An exemplary scented antibacterial electrospun nanofibrous layer may also be utilized as an insect repellent layer.

FIG. 1 illustrates a flowchart of a method 100 for preparing a scented antibacterial nanofibrous layer, consistent with one or more exemplary embodiments of the present disclosure. In an exemplary embodiment, method 100 may include a step 102 of preparing a polymer solution by dissolving a base polymer in a first solvent, a step 104 of mixing a surfactant with the polymer solution, a step 106 of mixing a volatile aromatic compound with the polymer solution, a step 108 of preparing an amine-terminated dendritic polymer solution by dissolving an amine-terminated dendritic polymer in a second solvent, a step 110 of preparing a spinning solution by dispersing the amine-terminated dendritic polymer solution into the polymer solution, and a step 112 of preparing the scented antibacterial nanofibrous layer electrospinning the spinning solution to obtain the scented nanofibrous layer.

In an exemplary embodiment, step 102 may include preparing the polymer solution by dissolving a base polymer such as nylon, polyester, polyvinyl alcohol, chitosan, acrylic, or combinations thereof in a suitable first solvent for the first polymer, where the first solvent may be one of formic acid, dimethylformamide/dichloromethane mixture, water, acetic acid, dimethylformamide, dimethyl sulfoxide, and mixtures thereof. In an exemplary embodiment, the polymer solution may have a polymer-to-solvent concentration between 4 (w/v) % and 30 (w/v) %.

In an exemplary embodiment, step 104 may include mixing a surfactant such as anionic, cationic, amphoteric, nonionic, Gemini surfactants or combinations thereof with the polymer solution. In an exemplary embodiment, the surfactant may have a concentration between 0.1 (w/v) % and 15 (w/v) % based on the total volume of the polymer solution. In an exemplary embodiment, mixing a surfactant with the polymer solution may aid in emulsifying an exemplary mixture of an exemplary polymer solution and an exemplary dendritic polymer solution that may be mixed with the exemplary polymer solution in the following steps. In an exemplary embodiment, mixing a surfactant with the polymer solution may further enhance the antibacterial properties of an exemplary scented antibacterial nanofibrous layer.

In an exemplary embodiment, step 106 may include mixing the volatile aromatic compound with the polymer solution, such that the volatile aromatic compound may have a concentration between 10 wt. % and 50 wt. % based on the weight of the first polymer. In an exemplary embodiment, mixing the volatile aromatic compound with the polymer solution may include adding the volatile aromatic compound to the polymer solution while the polymer solution is being stirred with a stirrer, such as a mechanical stirrer, a sonicator, or other similar homogenizers. In an exemplary embodiment, adding the volatile aromatic compound to the polymer solution may include dropwise addition of the volatile aromatic compound to the polymer solution with an amount between 10 wt. % and 50 wt. % based on a weight of the base polymer. In an exemplary embodiment, adding the volatile aromatic compound to the polymer solution may include dropwise addition of an essential oil such as at least one of thyme, eucalyptus, tea, asparagus, clove, rosemary, lavender, and cinnamon to the polymer solution.

In an exemplary embodiment, step 108 may include dissolving the amine-terminated dendritic polymer in the second solvent in an amount such that the amine-terminated dendritic polymer may have a concentration between 2 wt. % and 20 wt. % based on the weight of the first polymer. In an exemplary embodiment, dissolving the amine-terminated dendritic polymer in the second solvent may include adding the amine-terminated dendritic polymer to the second solvent while being stirred by a stirrer such as a mechanical stirrer, a sonicator, or other similar homogenizers. In an exemplary embodiment, dissolving the amine-terminated dendritic polymer in the second solvent may include adding the amine-terminated dendritic polymer to at least one of formic acid, dimethylformamide/dichloromethane mixture, water, acetic acid, dimethylformamide, dimethyl sulfoxide, and mixtures thereof. In an exemplary embodiment, dissolving the amine-terminated dendritic polymer in the second solvent may include adding at least one of a hyperbranched polymer, a dendrigraft polymer, a dendrimer, or mixtures thereof in the second solvent. In an exemplary embodiment, the first solvent and the second solvent may be similar.

In an exemplary embodiment, step 110 may include preparing the spinning solution by dispersing the amine-terminated dendritic polymer solution into the polymer solution, such that the spinning solution may include the base polymer with a concentration between 4 (w/v) % and 30 (w/v) % in the first solvent, the volatile aromatic compound with a concentration between 5 wt. % and 50 wt. % based on the weight of the first polymer, and the amine-terminated dendritic polymer with a concentration between 4 wt. % and 30 wt. % based on the weight of the first polymer.

In an exemplary embodiment, step 112 may include electrospinning the spinning solution in an electrospinning apparatus to obtain the nanofibrous layer. In an exemplary embodiment, the electrospinning may be carried out with different flow rates at different spray-to-collector distances. For example, electrospinning the spinning solution may be carried out at a nozzle-to-collector distance between 5 cm and 30 cm at a voltage between −40 kV and +40 kV, and with a flow rate of between 0.1 cm$^3$ hr$^{-1}$ and 2 cm$^3$ hr$^{-1}$. In an exemplary embodiment, step 112 may include electrospinning the spinning solution in a needleless electrospinning apparatus to obtain the nanofibrous layer.

Example 1

In this example, a nanofibrous polyacrylonitrile (PAN) layer containing Eucalyptus essential oil (EEO) is prepared by electrospinning a spinning solution containing the EEO and an amine-terminated dendritic polymer (ATDP). The spinning solution in this exemplary embodiment includes a polymer solution of PAN in dimethylformamide (DMF) with a PAN-to-DMF concentration of approximately 30 (w/v) %, 50 wt. % of EEO based on the weight of PAN and 10 wt. % of the ATDP based on the weight of PAN. The prepared spinning solution is electrospun in an electrospinning system with a feeding rate of approximately 0.2 ml/min, an electrospinning distance of approximately 10 cm, and a voltage of approximately 15 kV. The electrospinning process was carried out for 4 hours and the resultant nanofibrous layer was labeled PAN-EEO-ATDP. For purposes of comparison, two other samples were prepared under similar electrospinning conditions as described above. One sample was prepared using a spinning solution containing only a polymer solution of PAN in dimethylformamide (DMF) with a PAN-to-DMF concentration of approximately 30 (w/v) %, and another sample was prepared using a spinning solution containing a polymer solution of PAN in dimethylformamide (DMF) with a PAN-to-DMF concentration of approximately 30 (w/v) %, and 50 wt. % of EEO based on the weight of PAN, which was labeled as PAN-EEO. Further details regarding (XXXX) are provided below with respect to FIGS. Y-Z.

Example 2

In this example, a nanofibrous polyacrylonitrile (PAN) layer containing tea essential oil (TEO) is prepared by electrospinning a spinning solution containing the TEO and an amine-terminated dendritic polymer (ATDP). The spinning solution in this exemplary embodiment includes a polymer solution of PAN in dimethylformamide (DMF) with a PAN-to-DMF concentration of approximately 18 (w/v) %, 30 wt. % of TEO based on the weight of PAN, and 10 wt. % of the ATDP based on the weight of PAN. The prepared spinning solution is electrospun in an electrospinning system with a feeding rate of approximately 0.2 ml/min, an electrospinning distance of approximately 10 cm, and a voltage of approximately 15 kV. The electrospinning process was carried out for 4 hours and the resultant nanofibrous layer was labeled PAN-TEO-ATDP. For purposes of comparison, another sample was prepared under similar electrospinning conditions as described above. The sample was prepared using a spinning solution containing a polymer solution of PAN in dimethylformamide (DMF) with a PAN-to-DMF concentration of approximately 18 (w/v) %, and 30 wt. % of TEO based on the weight of PAN, which was labeled as PAN-TEO. Further details regarding (XXXX) are provided below with respect to FIGS. Y-Z.

Figure 2:
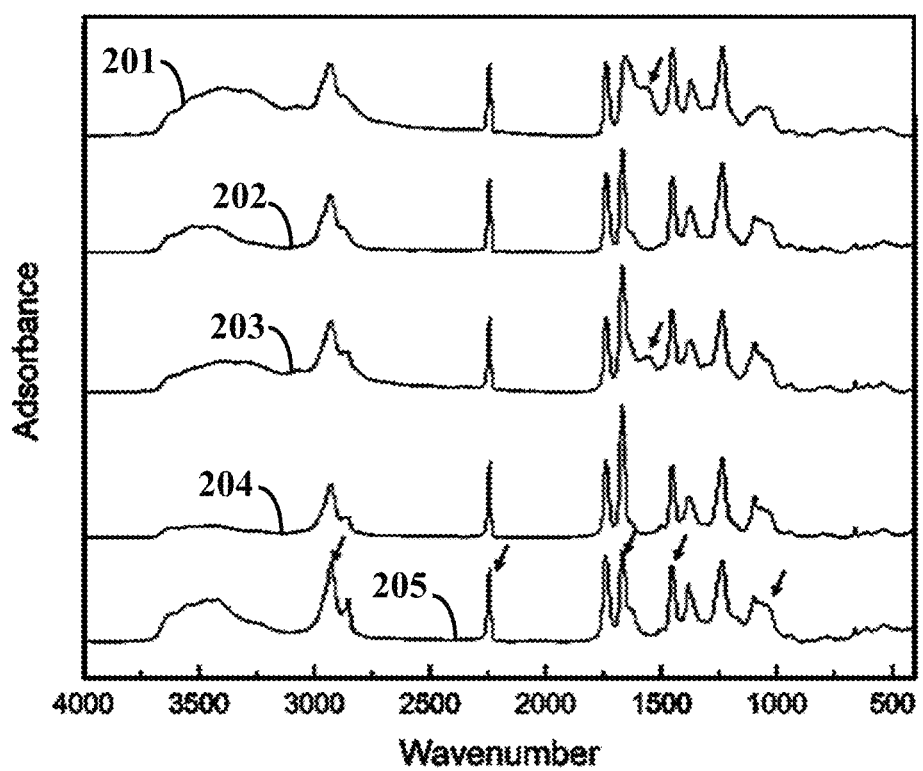
FIG. 2 illustrates Fourier-transform infrared (FTIR) spectra of nanofibrous layers, consistent with one or more exemplary embodiments of the present disclosure.

FIG. 2 illustrates Fourier-transform infrared (FTIR) spectra of nanofibrous layers, consistent with one or more exemplary embodiments of the present disclosure. Referring to FIG. 2, FTIR spectrum 201 of PAN-TEO-ATDP, FTIR spectrum 202 of PAN-TEO, FTIR spectrum 203 of PAN-EEO-ATDP, FTIR spectrum 204 of PAN-EEO, and FTIR spectrum 205 of the sample containing only PAN are illustrated in this figure. In FTIR spectra 201 to 205, peak at 2240 cm$^{-1}$ indicates the presence of —C≡N, peak at 2925 cm$^{-1}$ indicates the presence of CH$_2$, peak at 1739 cm$^{-1}$ indicates the presence of C=O, peak at 1096 cm$^{-1}$ indicates the presence of C—O, peak at 2244 cm$^{-1}$ indicates the presence of nitrile group, and peak at 1497 cm$^{-1}$ indicates the presence of methylene groups in the samples. In FTIR spectra 201 and 203, peaks at 1561 cm$^{-1}$ indicate the presence of amide groups which confirm the presence of the dendritic compounds in PAN-TEO-ATDP and PAN-EEO-ATDP samples.

Figure 3A:
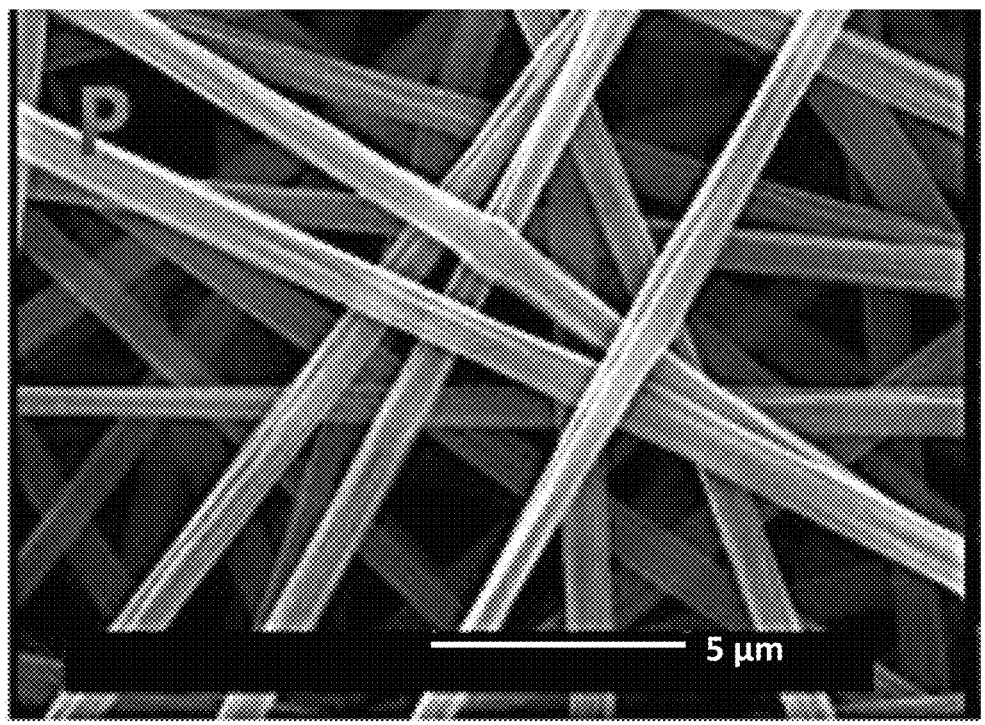
FIG. 3A illustrates a scanning electron microscope (SEM) image of a nanofibrous sample containing polyacrylonitrile (PAN), consistent with one or more exemplary embodiments of the present disclosure.
Figure 3B:
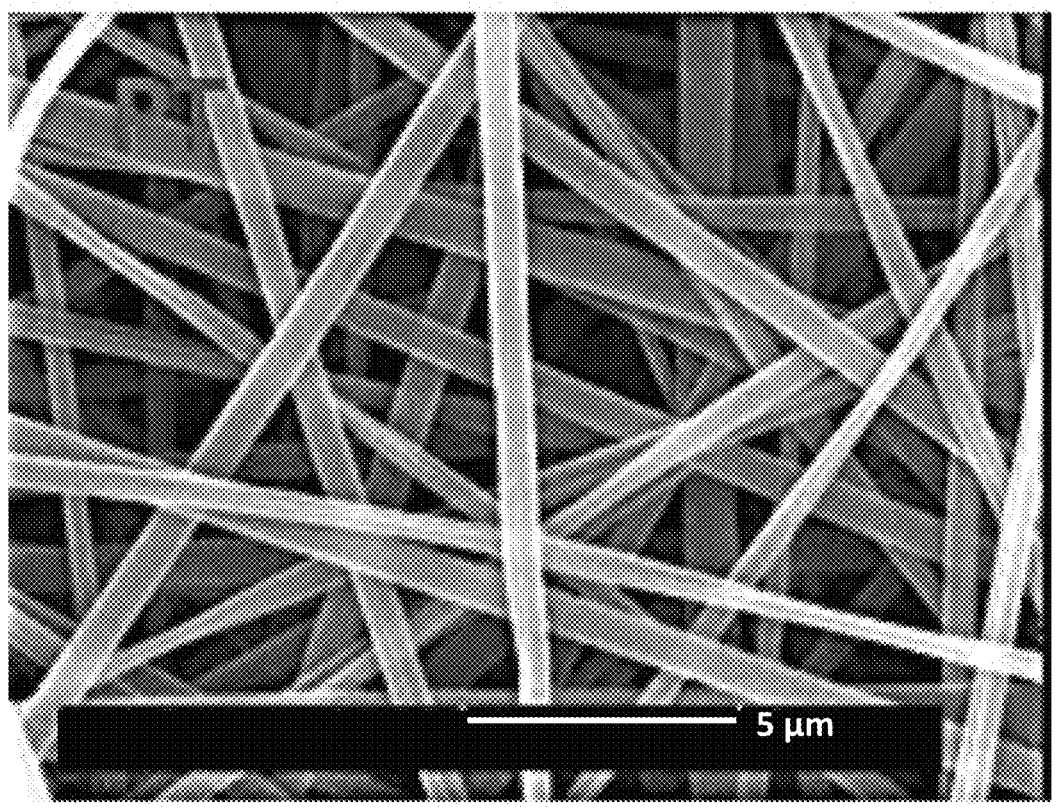
FIG. 3B illustrates an SEM image of a PAN-tea essential oil (TEO) sample, consistent with one or more exemplary embodiments of the present disclosure.
Figure 3C:
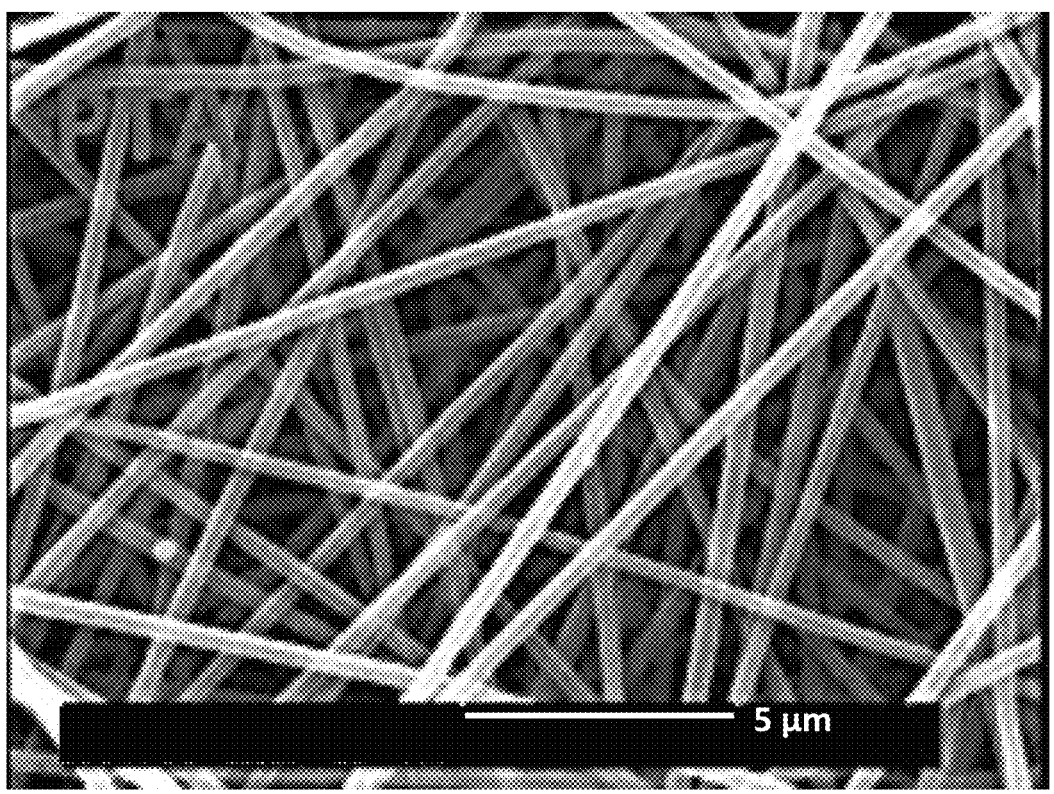
FIG. 3C illustrates an SEM image of a PAN-TEO-amine-terminated dendritic polymer (ATDP) sample, consistent with one or more exemplary embodiments of the present disclosure.
Figure 3D:
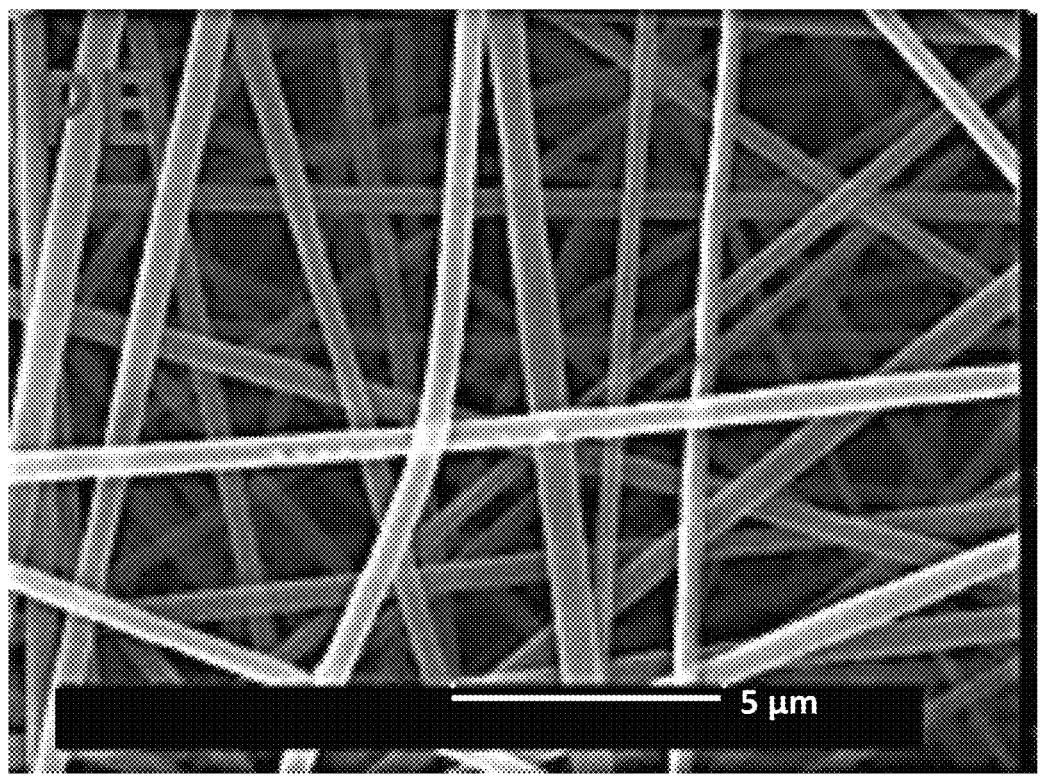
FIG. 3D illustrates an SEM image of a PAN-Eucalyptus essential oil (EEO) sample, consistent with one or more exemplary embodiments of the present disclosure.

FIG. 3A illustrates a scanning electron microscope (SEM) image of a nanofibrous sample containing PAN prepared as described in connection with Example 1; FIG. 3B illustrates an SEM image of the PAN-TEO sample prepared as described in connection with Example 2; FIG. 3C illustrates an SEM image of the PAN-TEO-ATDP sample prepared as described in connection with Example 2; FIG. 3D illustrates an SEM image of the PAN-EEO sample prepared as described in connection with Example 1; and FIG. 3E illustrates an SEM image of the PAN-EEO-ATDP sample prepared as described in connection with Example 1.

Figure 3E:
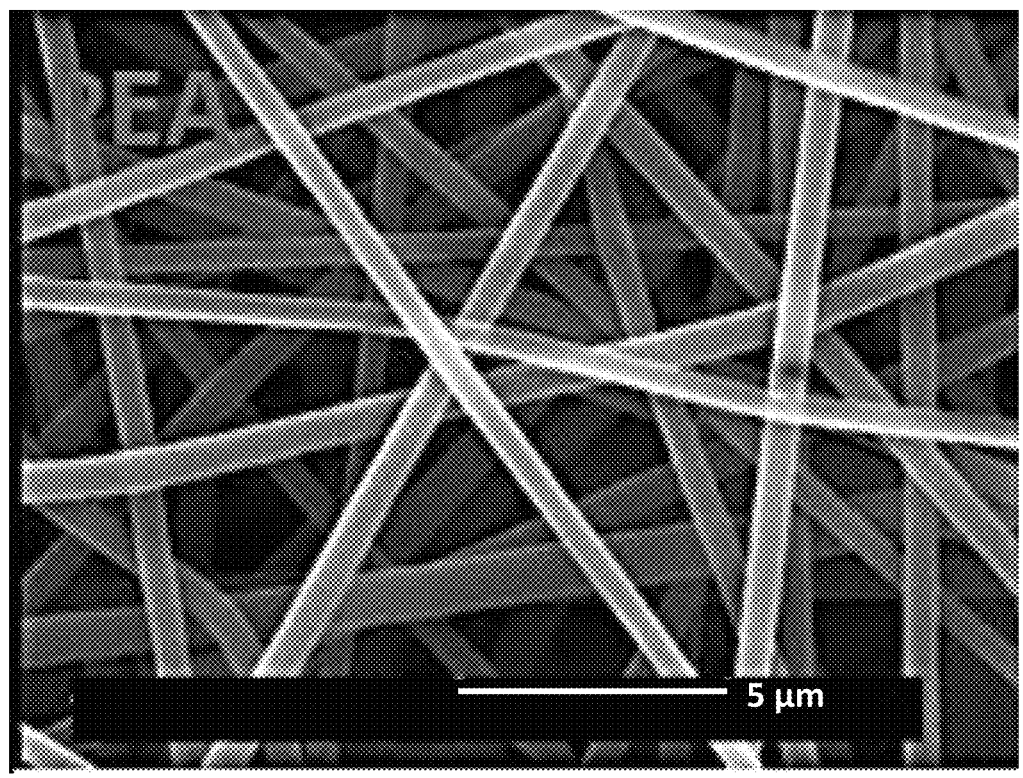
FIG. 3E illustrates an SEM image of a PAN-EEO-ATDP sample, consistent with one or more exemplary embodiments of the present disclosure.

Referring to FIGS. 3A to 3E, morphology and average diameter of different nanofibrous layers prepared as described in Examples 1 and 2 and the effects of additives such as EEO, TEO, and ADP on the morphology and average diameter of the prepared nanofibrous layers may be investigated. Referring to FIGS. 3A to 3C, it can be observed that the addition of TEO reduces the average diameter of the PAN nanofibers from 867±0.11 nm to 675±20 nm and addition of TEO along with ATDP reduces the average diameter of the PAN nanofibers from 867±0.11 nm to 401±0.4 nm. Referring to FIGS. 3A, 3D, and 3E, it can be observed that the addition of EEO reduces the average diameter of the PAN nanofibers from 867±0.11 nm to 414±80 nm and addition of EEO along with ATDP reduces the average diameter of the PAN nanofibers from 867±0.11 nm to 645±10 nm.

The antibacterial performances of the prepared samples in Examples 1 and 2 were investigated by the American Association of Textile Chemists and Colorists (AATCC) 100 test method. The ability of the PAN-TEO-ATDP, PAN-EEO-ATDP, PAN-TEO, PAN-EEO, and the sample containing only PAN nanofibers to eliminate or inhibit the growth of microorganisms over a 24 hour period of contact was tested by AATCC 100 test method. A bacterial suspension with a concentration of 102 bacteria per 100 μL of the bacterial suspension was utilized for conducting the AATCC 100 test. Two bacterial of S. aureus and E. coli were used for conducting the tests. Table 1 summarizes the AATCC 100 test results for the samples prepared as described in detail in connection with Example 2.

TABLE 1

| Sample | Antibacterial Activity [%] |
|---|---|
| S. aureus | |
| Control Sample (containing only PAN) | — |
| PAN-TEO (1 day after being electrospun) | 78.00 |
| PAN-TEO (3 days after being electrospun) | 65.45 |
| PAN-TEO (7 days after being electrospun) | 16.67 |
| PAN-TEO-ATDP (1 day after being electrospun) | 94.00 |
| PAN-TEO-ATDP (3 days after being electrospun) | 79.09 |
| PAN-TEO-ATDP (7 days after being electrospun) | 26.19 |
| E. coli | |
| Control Sample (containing only PAN) | — |
| PAN-TEO (1 day after being electrospun) | 90.00 |
| PAN-TEO (3 days after being electrospun) | 76.20 |
| PAN-TEO (7 days after being electrospun) | 22.58 |
| PAN-TEO-ATDP (1 day after being electrospun) | 89.00 |
| PAN-TEO-ATDP (3 days after being electrospun) | 81.62 |
| PAN-TEO-ATDP (7 days after being electrospun) | 38.71 |

Referring to Table 1, for tests conducted in the presence of S. aureus bacterial suspensions, it is observed that nanofibrous layers containing TEO are antibacterial. For example, PAN-TEO nanofibrous layer shows 78 percent antibacterial activity, one day after being electrospun and its antibacterial activity decreases to 16.67 percent after 7 days. While for example, PAN-TEO-ATDP nanofibrous layer shows 94 percent antibacterial activity, one day after being electrospun, and its antibacterial activity decreases to 26.19 percent after 7 days. This may indicate that the presence of ATDP in the structure of the nanofibrous layer has increased both the antibacterial activity and durability of this antibacterial activity of the nanofibrous layer.

With further reference to Table 1, for tests conducted in the presence of E. coli bacterial suspensions, it is observed that nanofibrous layers containing TEO are antibacterial. For example, PAN-TEO nanofibrous layer shows 90 percent antibacterial activity, one day after being electrospun and its antibacterial activity decreases to 22.58 percent after 7 days. While for example, PAN-TEO-ATDP nanofibrous layer shows 89 percent antibacterial activity, one day after being electrospun, and its antibacterial activity decreases to 38.71 percent after 7 days. This may indicate that the presence of ATDP in the structure of the nanofibrous layer has increased the durability of the antibacterial activity of the nanofibrous layer.

An electronic nose comprising a single or alternatively an array of chemo-resistive gas sensors was utilized for testing and monitoring the release of TEO or EEO from the samples prepared as described in Examples 1 and 2. The response of the sensor is measured in volts as a function of time.

Figure 4A:
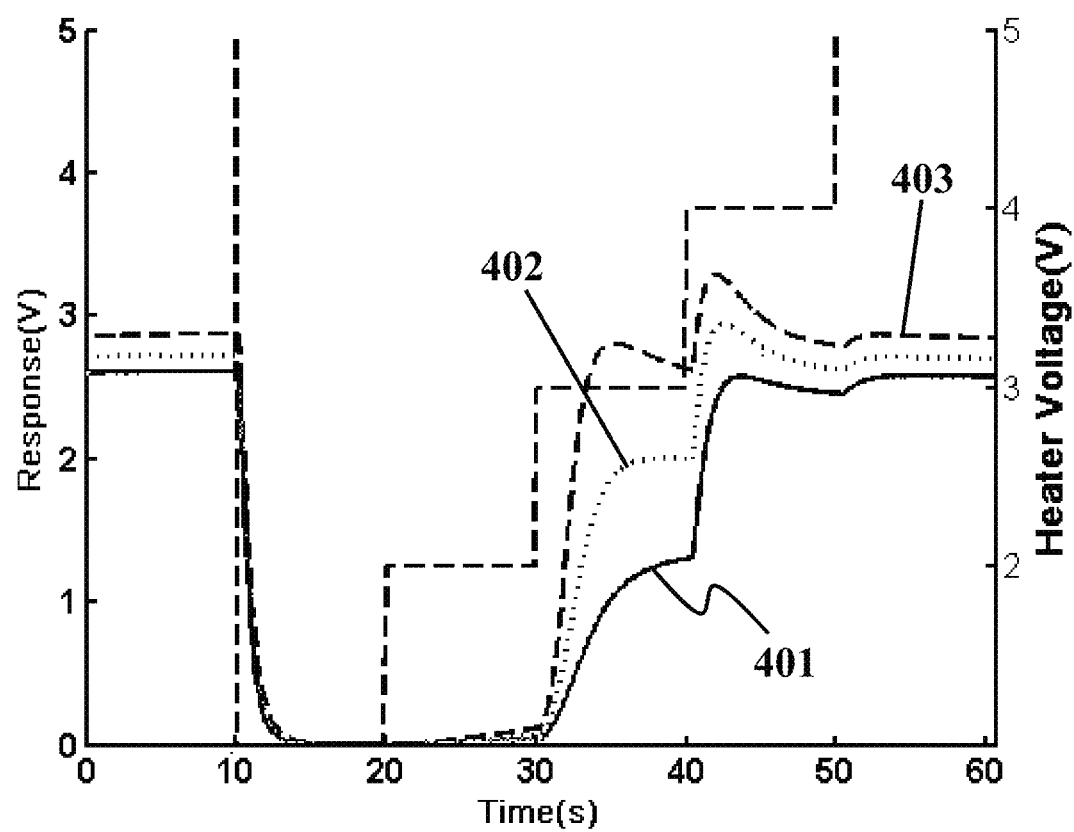
FIG. 4A illustrates gas sensor responses to the release of EEO from PAN Nanofibrous layers in the presence and absence of ATDP after one day, consistent with one or more exemplary embodiments of the present disclosure.

FIG. 4A illustrates gas sensor responses to the release of EEO from PAN Nanofibrous layers in the presence and absence of ATDP after one day, according to an exemplary embodiment of the present disclosure. Referring to FIG. 4A, curve 401 is the baseline which is obtained for air without any odor, curve 402 is the sensor response to the release of EEO from PAN-EEO sample of Example 1 after one day, and curve 403 is the sensor response to the release of EEO from PAN-EEO-ATDP sample of Example 1 after one day.

Figure 4B:
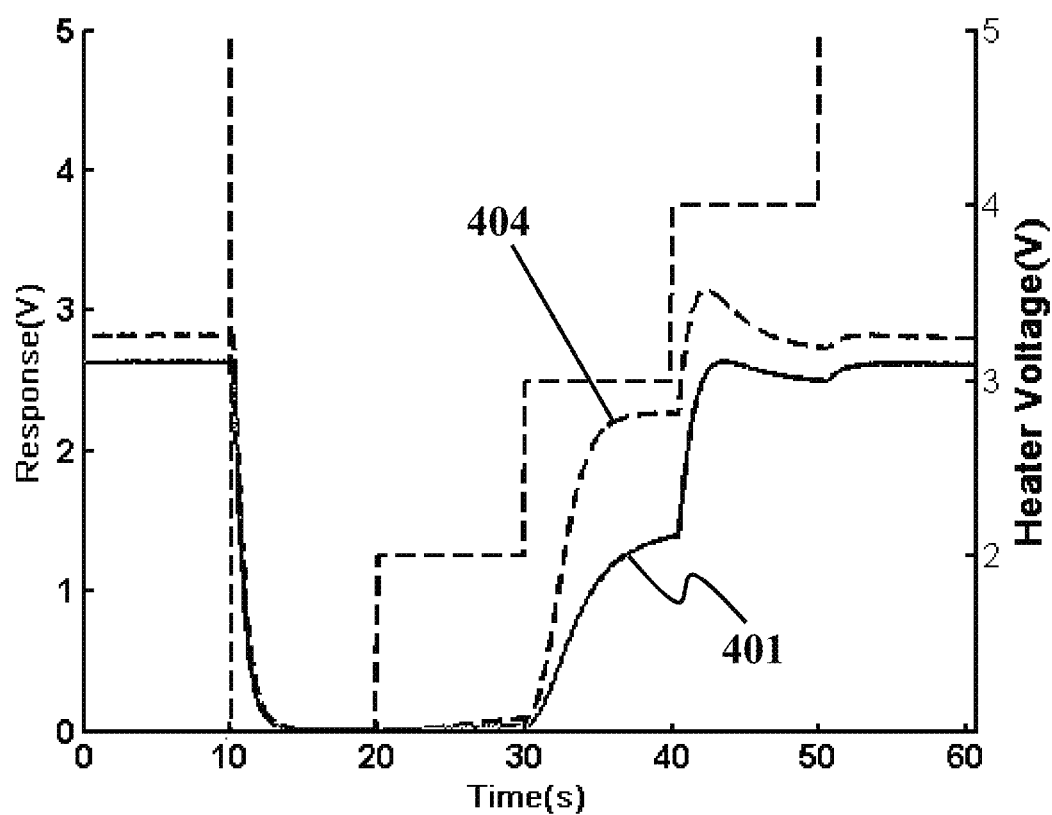
FIG. 4B illustrates gas sensor responses to the release of EEO from PAN Nanofibrous layers in the presence and absence of ATDP after six days, consistent with one or more exemplary embodiments of the present disclosure.

FIG. 4B illustrates gas sensor responses to the release of EEO from PAN Nanofibrous layers in the presence and absence of ATDP after six days, according to an exemplary embodiment of the present disclosure. Referring to FIG. 4A, curve 401 is the baseline which is obtained for air without any odor, and curve 404 is the sensor response to the release of EEO from PAN-EEO-ATDP sample of Example 1 after 6 days. The sensor response to the release of EEO from the PAN-EEO sample of Example 1 after 6 days is superimposed on the baseline (curve 401).

Figure 4C:
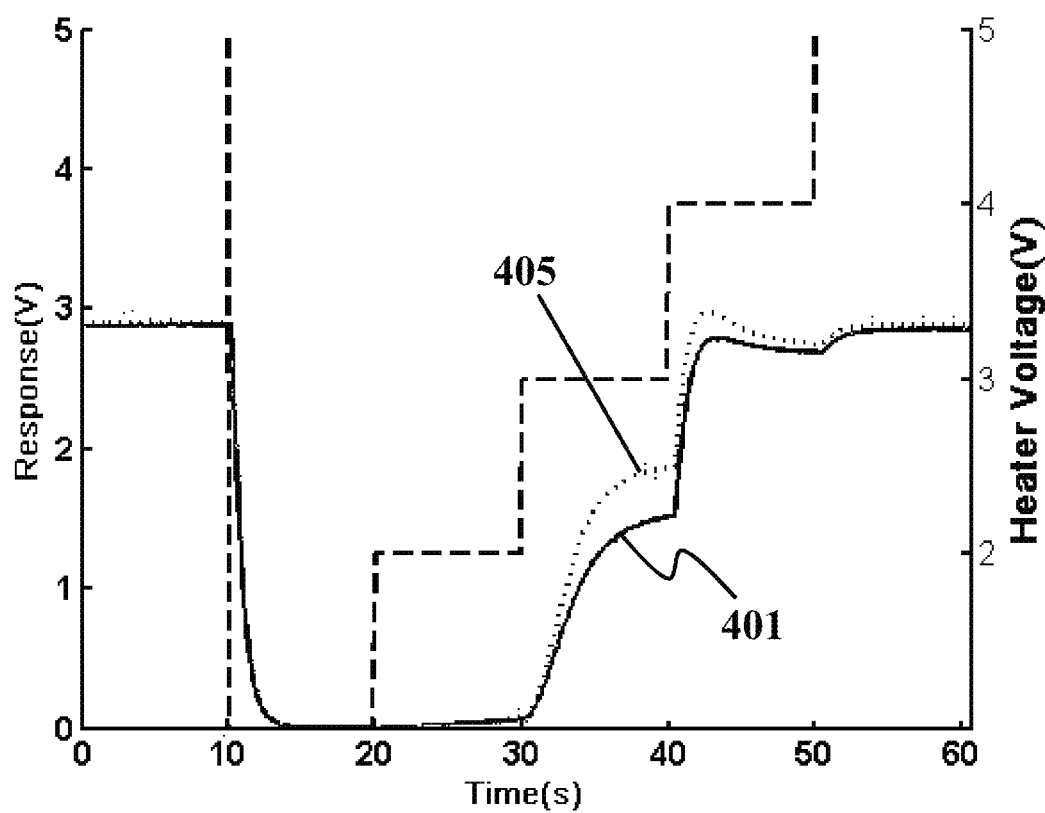
FIG. 4C illustrates gas sensor responses to the release of EEO from PAN Nanofibrous layers in the presence and absence of ATDP after 23 days, consistent with one or more exemplary embodiments of the present disclosure.

FIG. 4C illustrates gas sensor responses to the release of EEO from PAN Nanofibrous layers in the presence and absence of ATDP after 23 days, according to an exemplary embodiment of the present disclosure. Referring to FIG. 4A, curve 401 is the baseline which is obtained for air without any odor, and curve 405 is the sensor response to the release of EEO from the PAN-EEO-ATDP sample of Example 1 after 23 days. The sensor response to the release of EEO from the PAN-EEO sample of Example 1 after 23 days is superimposed on the baseline (curve 401).

Figure 5A:
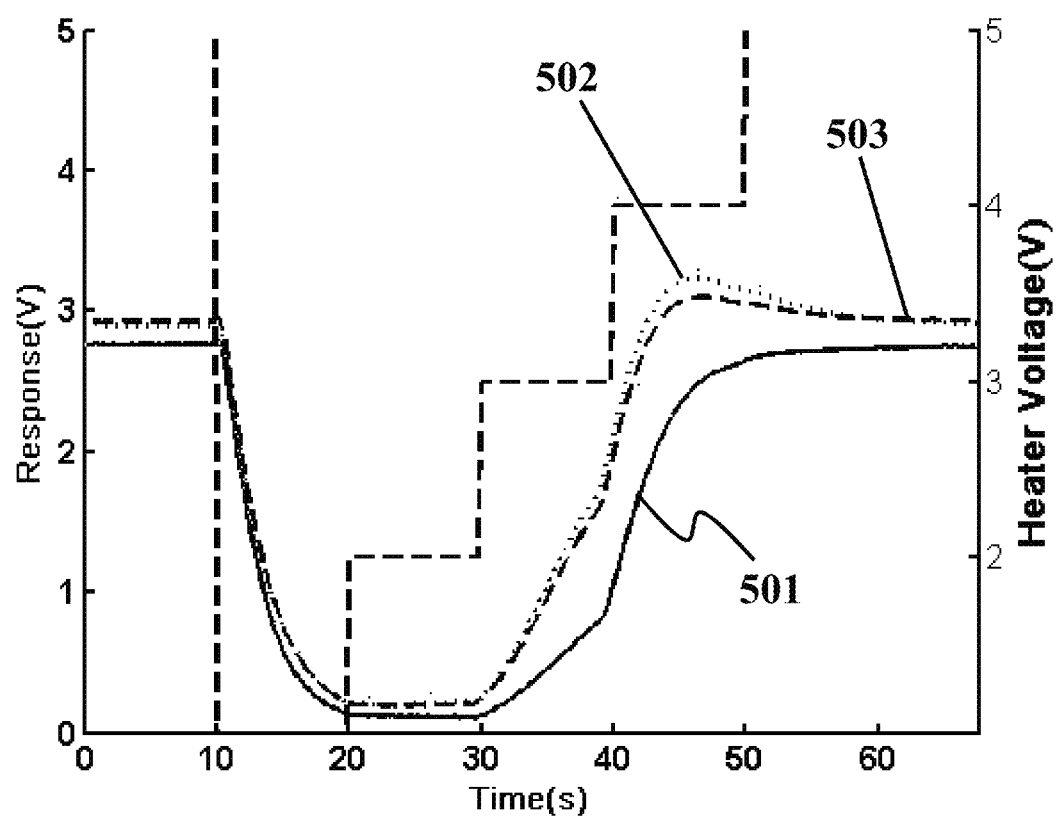
FIG. 5A illustrates gas sensor responses to the release of TEO from PAN Nanofibrous layers in the presence and absence of ATDP after one day, consistent with one or more exemplary embodiments of the present disclosure.

FIG. 5A illustrates gas sensor responses to the release of TEO from PAN Nanofibrous layers in the presence and absence of ATDP after one day, according to an exemplary embodiment of the present disclosure. Referring to FIG. 5A, curve 501 is the baseline which is obtained for air without any odor, curve 502 is the sensor response to the release of TEO from PAN-TEO sample of Example 2 after one day, and curve 503 is the sensor response to the release of TEO from PAN-TEO-ATDP sample of Example 2 after one day.

Figure 5B:
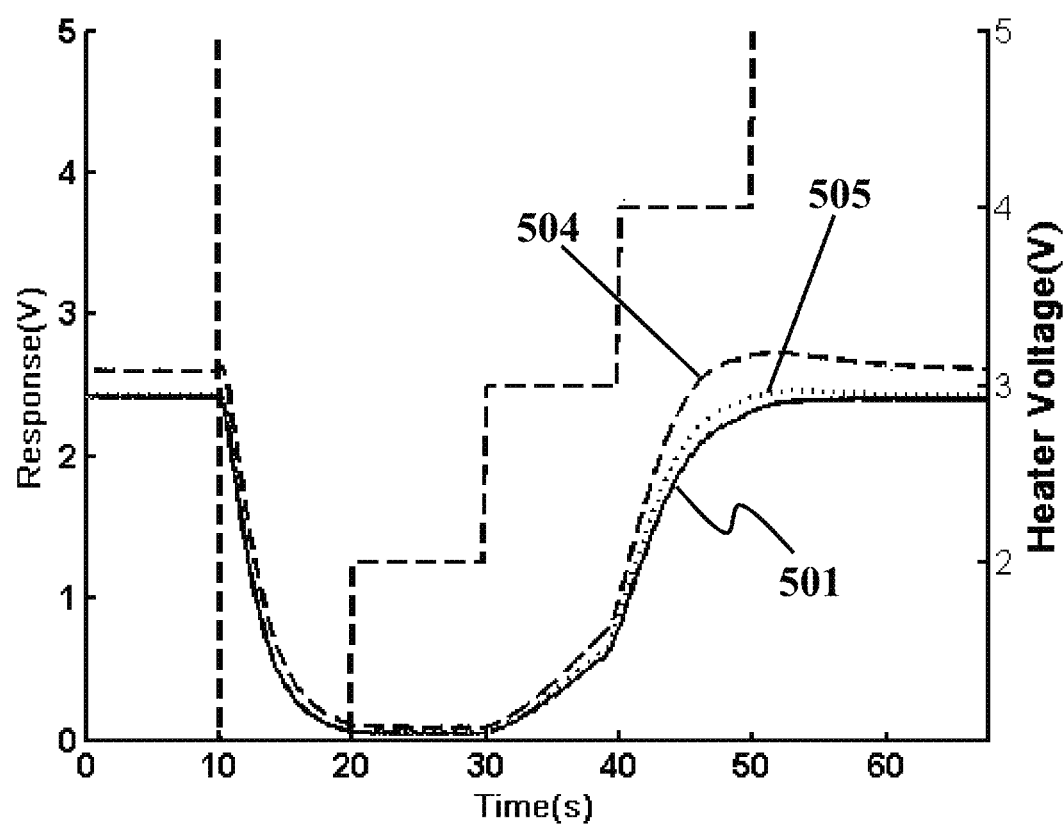
FIG. 5B illustrates gas sensor responses to the release of TEO from PAN Nanofibrous layers in the presence and absence of ATDP after 5 days, consistent with one or more exemplary embodiments of the present disclosure.

FIG. 5B illustrates gas sensor responses to the release of TEO from PAN Nanofibrous layers in the presence and absence of ATDP after 5 days, according to an exemplary embodiment of the present disclosure. Referring to FIG. 5B, curve 501 is the baseline which is obtained for air without any odor, curve 505 is the sensor response to the release of TEO from PAN-TEO sample of Example 2 after 5 days, and curve 504 is the sensor response to the release of TEO from PAN-TEO-ATDP sample of Example 2 after 5 days.

Figure 5C:
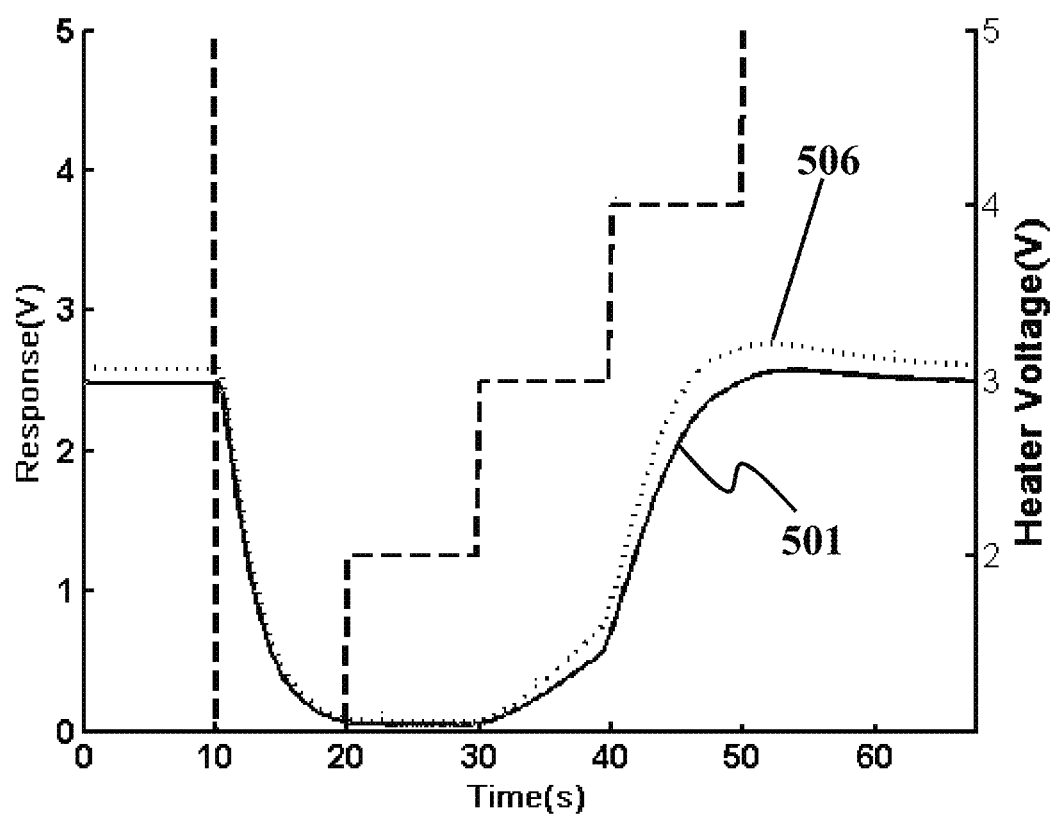
FIG. 5C illustrates gas sensor responses to the release of EEO from PAN Nanofibrous layers in the presence and absence of ATDP after 17 days, consistent with one or more exemplary embodiments of the present disclosure.

FIG. 5C illustrates gas sensor responses to the release of EEO from PAN Nanofibrous layers in the presence and absence of ATDP after 17 days, according to an exemplary embodiment of the present disclosure. Referring to FIG. 5C, curve 501 is the baseline which is obtained for air without any odor, and curve 506 is the sensor response to the release of TEO from the PAN-TEO-ATDP sample of Example 2 after 17 days. The sensor response to the release of TEO from the PAN-TEO sample of Example 2 after 17 days is superimposed on the baseline (curve 501).

With reference to FIGS. 4A-4C and FIGS. 5A-5C, it can be observed that the presence of the ATDP in the samples has increased the period of EEO release from the nanofibrous layer from 5 days to 23 days and has increased the period of TEO release from 5 days to 17 days.

Example 3

In this example, a nanofibrous nylon layer containing thyme essential oil (ThEO) is prepared by electrospinning a spinning solution containing the ThEO and an ATDP. The spinning solution in this exemplary embodiment includes a polymer solution of nylon in formic acid with a nylon-to-formic acid concentration of approximately 15 (w/v) %, 17 wt. % of ThEO based on the weight of the nylon, and 10 wt. % of the ATDP based on the weight of nylon. The spinning solution is prepared by first preparing a nylon 6 solution in formic acid and then adding a surfactant such as sodium dodecyl sulfate (SDS) with an SDS-to-polymer solution ratio of 2:100. The SDS and the polymer solution are mixed for approximately 15 minutes in for example a magnetic stirrer. After that ThEO is added to the polymer solution in a dropwise manner while being homogenized at 1000 rpm for 30 minutes and then at 2000 rpm for 15 minutes. ATDP is dissolved in formic acid and added to the spinning solution. The prepared spinning solution is electrospun in an electrospinning system with a feeding rate of approximately 0.2 ml/min, an electrospinning distance of approximately 10 cm, and a voltage of approximately 15 kV. The electrospinning process was carried out for 4 hours and the resultant nanofibrous layer was labeled ND10T17. For purposes of comparison, another sample was prepared under similar electrospinning conditions as described above. The sample was prepared using a spinning solution containing a polymer solution of nylon in formic acid with a nylon-to-formic acid concentration of approximately 15 (w/v) %, and 17 wt. % of ThEO based on the weight of nylon, which was labeled as NT17. A control sample containing only nylon nanofibers was also synthesized under similar electrospinning conditions.

The antibacterial performances of the prepared samples in Example 3 were investigated by AATCC 100 test method. A bacterial suspension with a concentration of 104 bacteria per 100 µL of the bacterial suspension was utilized for conducting the AATCC 100 test. Two bacterial of *S. aureus* and *E. coli* were used for conducting the tests. Table 2 summarizes the AATCC 100 test results for the samples prepared as described in detail in connection with Example 3.

TABLE 2

| Sample | Antibacterial Activity [%] |
|---|---|
| *S. aureus* | |
| Control Sample (containing only nylon) | — |
| NT17 (immediately after being electrospun) | 98.20 |
| NT17 (2 weeks after being electrospun) | 41.90 |
| ND10T17 (2 weeks after being electrospun) | 99.80 |
| *E. coli* | |
| Control Sample (containing only nylon) | — |
| NT17 (immediately after being electrospun) | 75.00 |
| NT17 (2 weeks after being electrospun) | 61.20 |
| ND10T17 (immediately after being electrospun) | 99.90 |
| ND10T17 (2 weeks after being electrospun) | 100 |

Referring to Table 2, the presence of ATDP in the structure of the nanofibrous layer has increased both the antibacterial activity and durability of this antibacterial activity of the nanofibrous layer.

An electronic nose comprising a single or alternatively an array of chemo-resistive gas sensors was utilized for testing and monitoring the release of ThEO from the samples prepared as described in Example 3. The response of the sensor is measured in volts as a function of time.

Figure 6A:
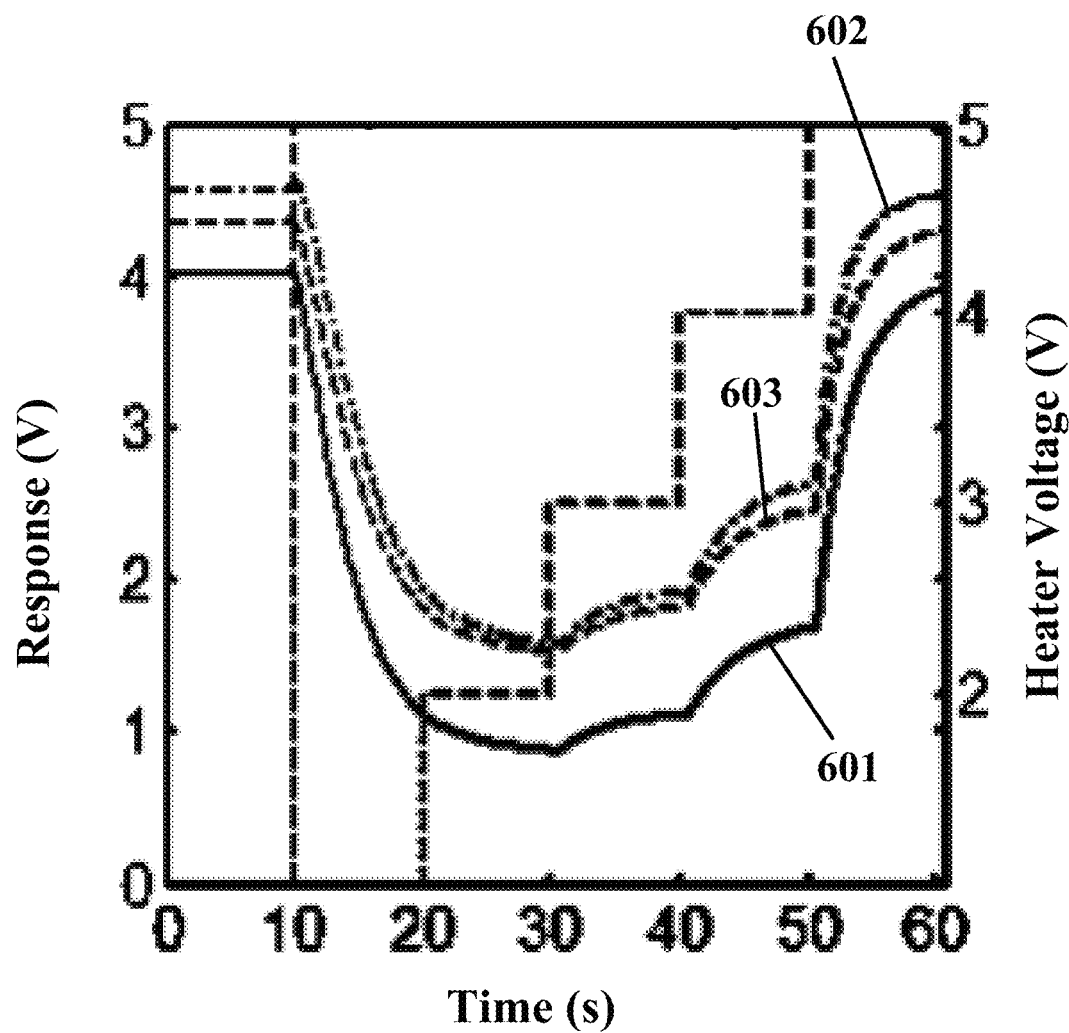
FIG. 6A illustrates gas sensor responses to the release of thyme essential oil (ThEO) from nylon nanofibrous layers in the presence and absence of ATDP immediately after preparation of the layers, consistent with one or more exemplary embodiments of the present disclosure.

FIG. 6A illustrates gas sensor responses to the release of ThEO from nylon nanofibrous layers in the presence and absence of ATDP immediately after the preparation of the layers, according to an exemplary embodiment of the present disclosure. Referring to FIG. 6A, curve 601 is the baseline which is obtained for air without any odor, curve 602 is the sensor response to the release of ThEO from NT17 sample of Example 1 immediately after preparation of the layer, and curve 603 is the sensor response to the release of ThEO from ND10T17 sample of Example 3 immediately after preparation of the layer.

Figure 6B:
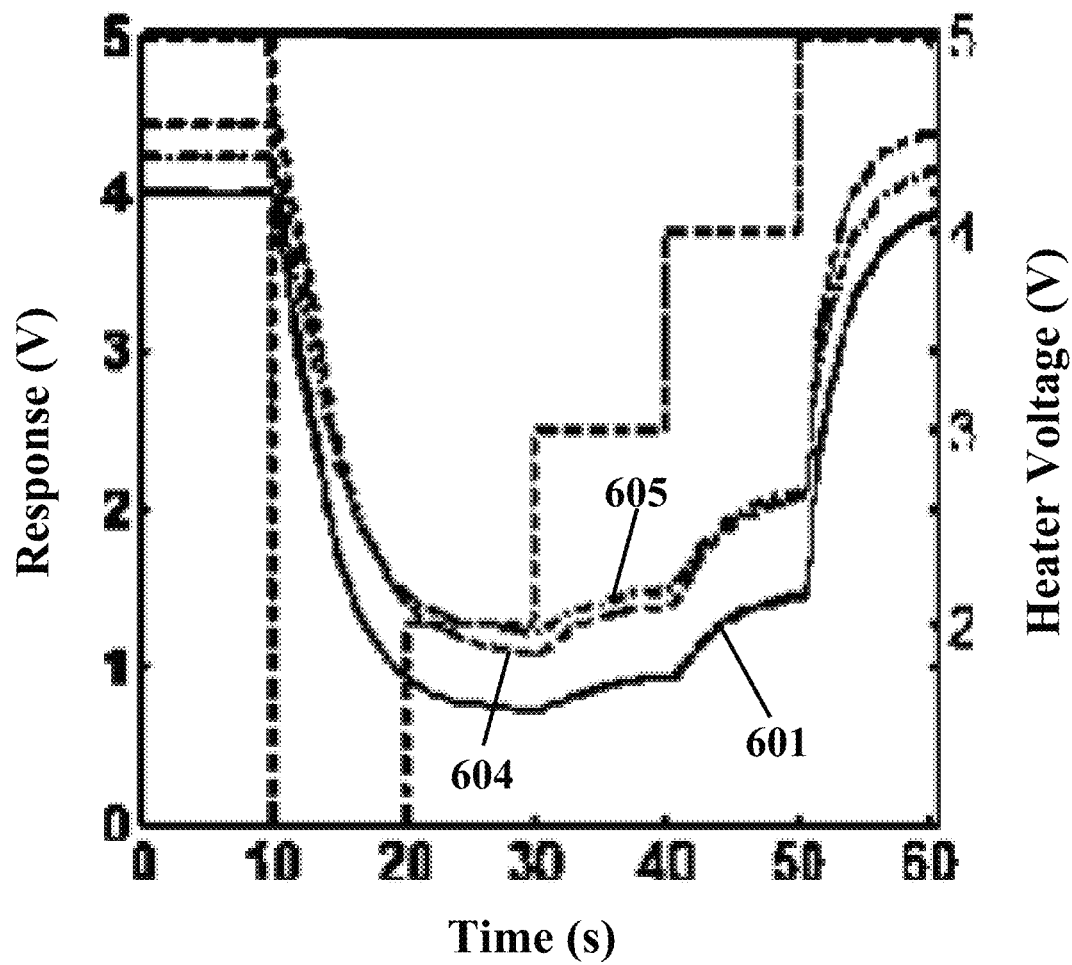
FIG. 6B illustrates gas sensor responses to the release of ThEO from nylon nanofibrous layers in the presence and absence of ATDP after one day, consistent with one or more exemplary embodiments of the present disclosure.

FIG. 6B illustrates gas sensor responses to the release of ThEO from nylon nanofibrous layers in the presence and absence of ATDP after one day, according to an exemplary embodiment of the present disclosure. Referring to FIG. 6B, curve 601 is the baseline which is obtained for air without any odor, curve 604 is the sensor response to the release of ThEO from NT17 sample of Example 1 after one day, and curve 605 is the sensor response to the release of ThEO from ND10T17 sample of Example 3 after one day.

Figure 6C:
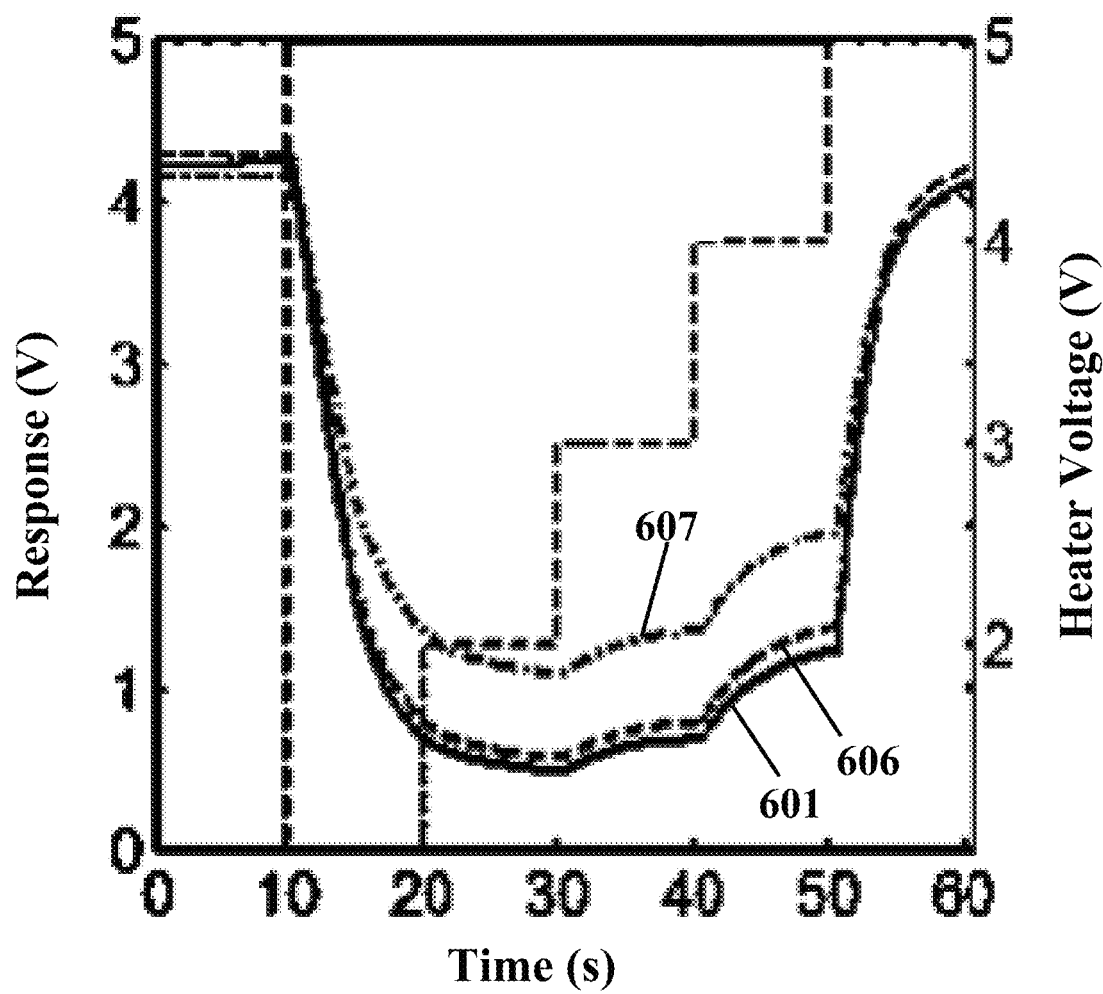
FIG. 6C illustrates gas sensor responses to the release of ThEO from nylon nanofibrous layers in the presence and absence of ATDP after 3 days, consistent with one or more exemplary embodiments of the present disclosure.

FIG. 6C illustrates gas sensor responses to the release of ThEO from nylon nanofibrous layers in the presence and absence of ATDP after 3 days, according to an exemplary embodiment of the present disclosure. Referring to FIG. 6B, curve 601 is the baseline which is obtained for air without any odor, curve 606 is the sensor response to the release of ThEO from NT17 sample of Example 1 after 3 days, and curve 607 is the sensor response to the release of ThEO from ND10T17 sample of Example 3 after 3 days.

Figure 6D:
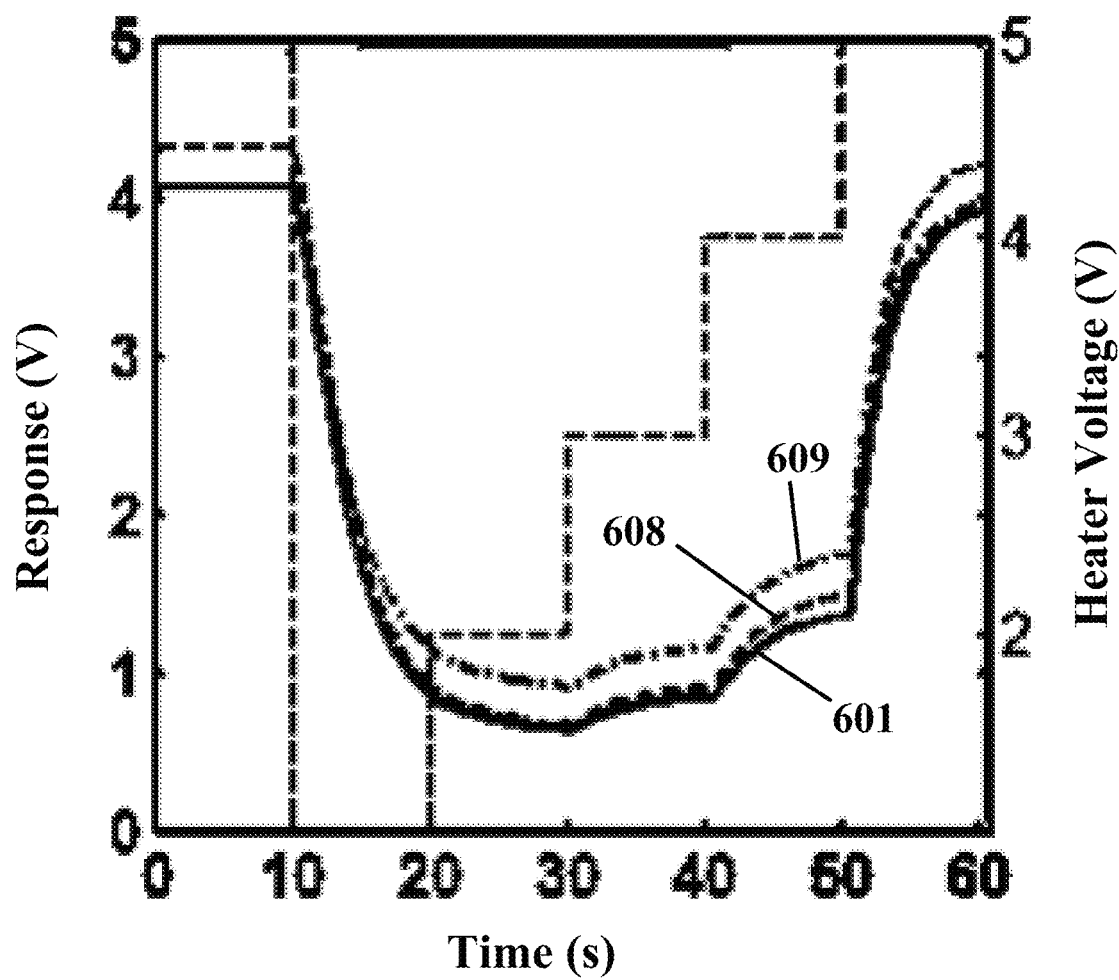
FIG. 6D illustrates gas sensor responses to the release of ThEO from nylon nanofibrous layers in the presence and absence of ATDP after 4 days, consistent with one or more exemplary embodiments of the present disclosure.

FIG. 6D illustrates gas sensor responses to the release of ThEO from nylon nanofibrous layers in the presence and absence of ATDP after 4 days, according to an exemplary embodiment of the present disclosure. Referring to FIG. 6B, curve 601 is the baseline which is obtained for air without any odor, curve 608 is the sensor response to the release of ThEO from NT17 sample of Example 1 after 4 days, and curve 609 is the sensor response to the release of ThEO from ND10T17 sample of Example 3 after 4 days.

With reference to FIGS. 6A-6D and FIGS. 5A-5C, it can be observed that the presence of the ATDP in the samples has increased the period of ThEO release from the nanofibrous layer. This shows, by simultaneous electrospinning of a natural extract and a dendritic polymer in a spinning solution, antibacterial nanofibrous articles with long-lasting release of the essence and an improved antibacterial activity may be produced.

Example 4

In this example, a nanofibrous polyacrylonitrile (PAN) layer containing tea essential oil (TEO) is prepared by electrospinning a spinning solution containing the TEO and an amine-terminated dendritic polymer (ATDP). The spinning solution in this exemplary embodiment includes a polymer solution of PAN in dimethylformamide (DMF) with a PAN-to-DMF concentration of approximately 15 (w/v) %, 30 wt. % of TEO based on the weight of PAN, and 10 wt. % of the ATDP based on the weight of PAN. The prepared spinning solution is electrospun in a needless electrospun system with an electrospinning distance of approximately 10 cm, speed of the collecting active layer 20 rpm, and a voltage of approximately 40 kV. The electrospinning process was carried out for 20 min.

Figure 10:
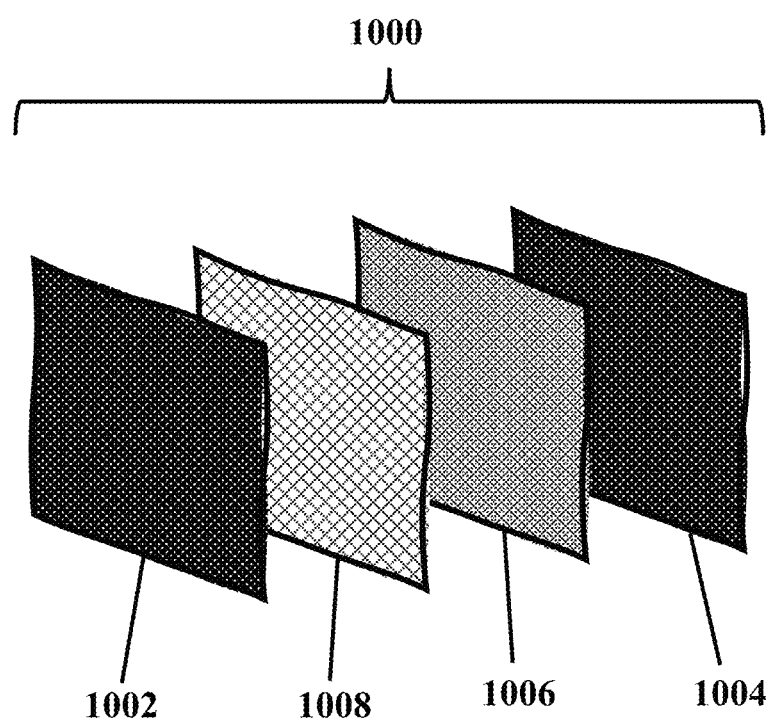
FIG. 10 illustrates a schematic of various layers of a scented face mask, consistent with one or more exemplary embodiments of the present disclosure.

In an exemplary embodiment, an exemplary scented antibacterial electrospun nanofibrous layer may be utilized as a filter layer in face masks. FIG. 10 illustrates a schematic of various layers of a scented face mask 1000, consistent with one or more exemplary embodiments of the present disclosure. In an exemplary embodiment, face mask 1000 may include an outer layer 1002 and an inner layer 1006 that may both be made of a spunbond polypropylene (PP) nonwoven fabric. In an exemplary embodiment, scented face mask 1000 may further include two intermediate layers, namely a regular inner layer 1004 and a scented antibacterial electrospun nanofibrous layer 1008. In an exemplary embodiment, regular inner layer 1004 may be a melt-blown PP nonwoven fabric. In an exemplary embodiment, scented antibacterial electrospun nanofibrous layer 1008 may be prepared by a method similar to method 100. In an exemplary embodiment, such incorporation of scented antibacterial electrospun nanofibrous layer 1008 within scented face mask 1000 may allow for a long-lasting release of an essence from scented face mask 1000.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, the inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for fabricating a nanofibrous fabric layer, the method comprising:
    preparing a first polymer solution by dissolving a base polymer in a first solvent, the base polymer comprising one of nylon, chitosan, and combinations thereof, the first solvent comprising one of formic acid, dimethyl formamide, acetic acid, dimethyl formamide, and mixtures thereof;
    adding a surfactant to the polymer solution;
    preparing a second polymer solution by dissolving an amine-terminated dendritic polymer and a volatile aromatic compound in a second solvent, the second solvent comprising one of methanol, ethanol, water, dimethyl formamide, and mixtures thereof, wherein the volatile aromatic compound includes an essential oil;
    preparing a spinning solution by dispersing the second polymer solution into the first polymer solution; and
    electrospinning the spinning solution to obtain the nanofibrous layer.

2. The method according to claim 1, wherein preparing the second polymer solution by dissolving the amine-terminated dendritic polymer and the volatile aromatic compound in the second solvent includes dissolving the amine-terminated dendritic polymer and the volatile aromatic compound in the second solvent with a volatile aromatic compound concentration of 10 wt. % to 50 wt. % based on the weight of the base polymer.

3. The method according to claim 1, wherein preparing the second polymer solution by dissolving the amine-terminated dendritic polymer and the volatile aromatic compound in the second solvent includes dissolving the amine-terminated dendritic polymer and the volatile aromatic compound in the second solvent with an amine-terminated dendritic polymer concentration of 2 wt. % to 30 wt. % based on the weight of the base polymer.

4. The method according to claim 1, wherein the essential oil includes one of thyme, eucalyptus, tea, asparagus, clove, rosemary, cinnamon, lavender, and combinations thereof.

5. The method according to claim 1, wherein the amine-terminated dendritic polymer includes one of polyamidoamine, polypropylene imine, polyethylene imine, and mixtures thereof.

* * * * *